(12) United States Patent
Nishikawa

(10) Patent No.: US 11,185,186 B2
(45) Date of Patent: Nov. 30, 2021

(54) BEVERAGE EXTRACTION DEVICE

(71) Applicant: FUJI ELECTRIC CO., LTD., Kawasaki (JP)

(72) Inventor: Yohei Nishikawa, Yokkaichi (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 378 days.

(21) Appl. No.: 16/364,965

(22) Filed: Mar. 26, 2019

(65) Prior Publication Data
US 2019/0216255 A1    Jul. 18, 2019

Related U.S. Application Data

(63) Continuation of application No. PCT/JP2017/042072, filed on Nov. 22, 2017.

(30) Foreign Application Priority Data

Dec. 22, 2016 (JP) .............................. JP2016-249341
Mar. 23, 2017 (JP) .............................. JP2017-057663

(51) Int. Cl.
*A47J 31/36* (2006.01)
*A47J 31/44* (2006.01)
(Continued)

(52) U.S. Cl.
CPC .......... *A47J 31/4407* (2013.01); *A47J 31/36* (2013.01); *A47J 31/3619* (2013.01);
(Continued)

(58) Field of Classification Search
CPC ................ A47J 31/3619; A47J 31/3609; A47J 31/3671; A47J 31/0663
(Continued)

(56) References Cited

U.S. PATENT DOCUMENTS 5,153,016 A    10/1992  Göckelmann
6,857,352 B2 *  2/2005  Fischer ............... A47J 31/3623
                                                            99/280
(Continued)

FOREIGN PATENT DOCUMENTS

DE      2435436 A1 *  2/1976  .......... A47J 31/3614
JP     02-104487 U     8/1990
(Continued)

OTHER PUBLICATIONS

China Patent Office, "Office Action for Chinese Patent Application No. 2017800607124, dated Sep. 17, 2020".

(Continued)

*Primary Examiner* — Reginald Alexander
(74) *Attorney, Agent, or Firm* — Manabu Kanesaka

(57) ABSTRACT

A beverage extraction device includes a mesh member, a cover member that is movable between a first position and a second position; a scraper portion, an upper end portion of which is pivotally supported by the cover member with a lower end portion of the scraper portion being swingable along a vertical direction, that takes a basic attitude in which the lower end portion is positioned lower than the upper end portion under a normal condition, the lower end portion being configured to slide on the mesh member when the cover member is moved from the first position toward the second position; and a contact member configured to come into contact with the scraper portion sliding on the mesh member to cause the scraper portion to take an attitude in which the lower end portion swings upward when the cover member approaches the second position.

7 Claims, 28 Drawing Sheets

(51) Int. Cl.
*A47J 31/42* (2006.01)
*A47J 31/40* (2006.01)

(52) U.S. Cl.
CPC ........... *A47J 31/3671* (2013.01); *A47J 31/40* (2013.01); *A47J 31/42* (2013.01); *A23F 2200/00* (2013.01); *A47J 31/3609* (2013.01)

(58) Field of Classification Search
USPC .............................................. 99/289 R, 302 P
See application file for complete search history.

(56) References Cited

U.S. PATENT DOCUMENTS

| | | |
|---|---|---|
| 8,371,211 B2 | 2/2013 | Nosler et al. |
| 8,621,982 B2 | 1/2014 | Nosler et al. |
| 2006/0117960 A1* | 6/2006 | Fischer ............... A47J 31/3619 99/279 |
| 2011/0086148 A1 | 4/2011 | Ford |
| 2013/0180407 A1* | 7/2013 | Colleoni ............. A47J 31/3619 99/289 R |

FOREIGN PATENT DOCUMENTS

| | | |
|---|---|---|
| JP | 2003-299576 A | 10/2003 |
| JP | 2010-069187 A | 4/2010 |
| JP | 2011-515198 A | 5/2011 |
| JP | 4760549 B2 | 8/2011 |

OTHER PUBLICATIONS

PCT/ISA/237; Written Opinion of the International Searching Authority dated Feb. 27, 2018 in International (PCT) Application No. PCT/JP2017/042072.

PCT/ISA/210 & 220; International Search Report dated Feb. 27, 2018 in International (PCT) Application No. PCT/JP2017/042072.

* cited by examiner

FIG.3
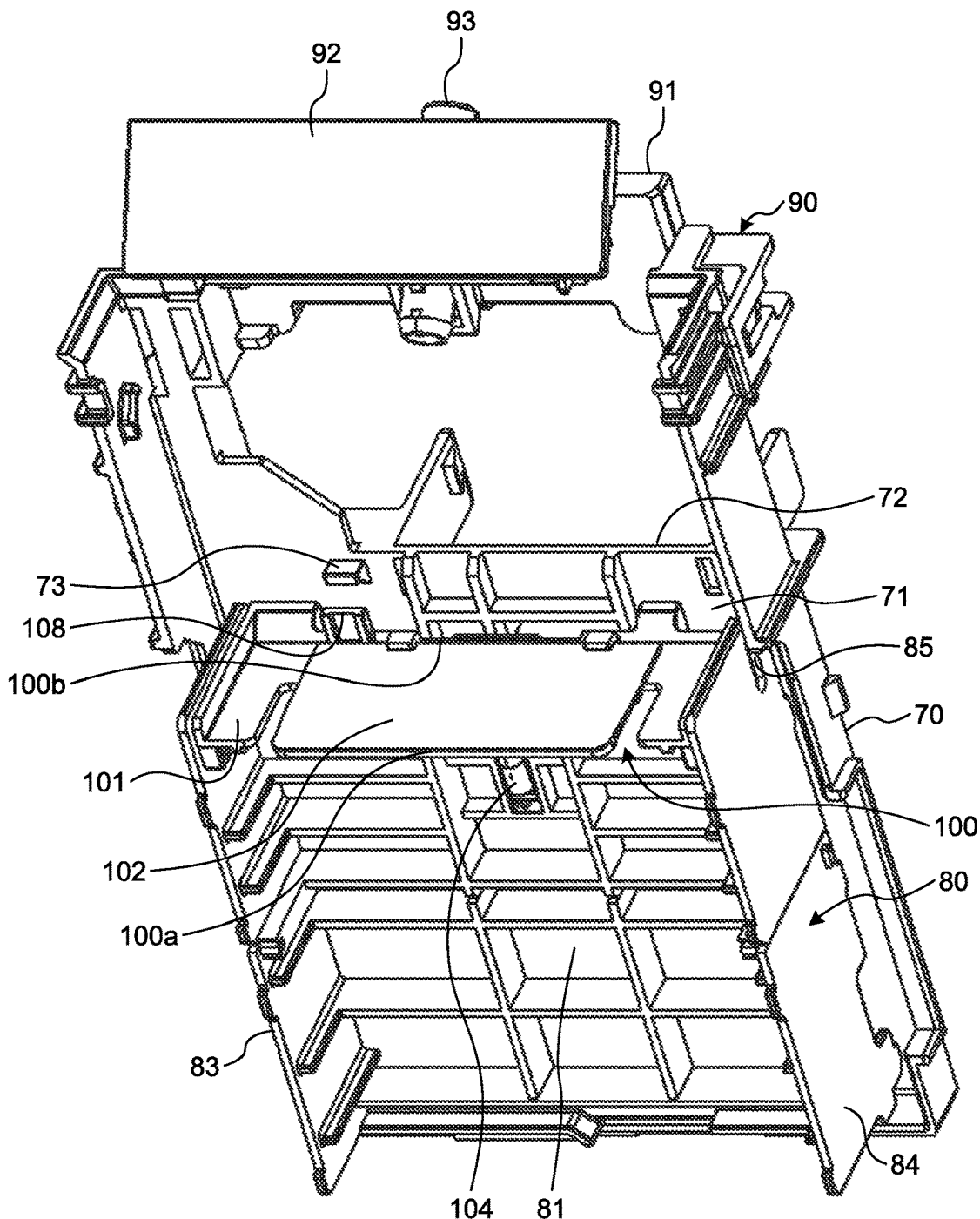

FIG.4
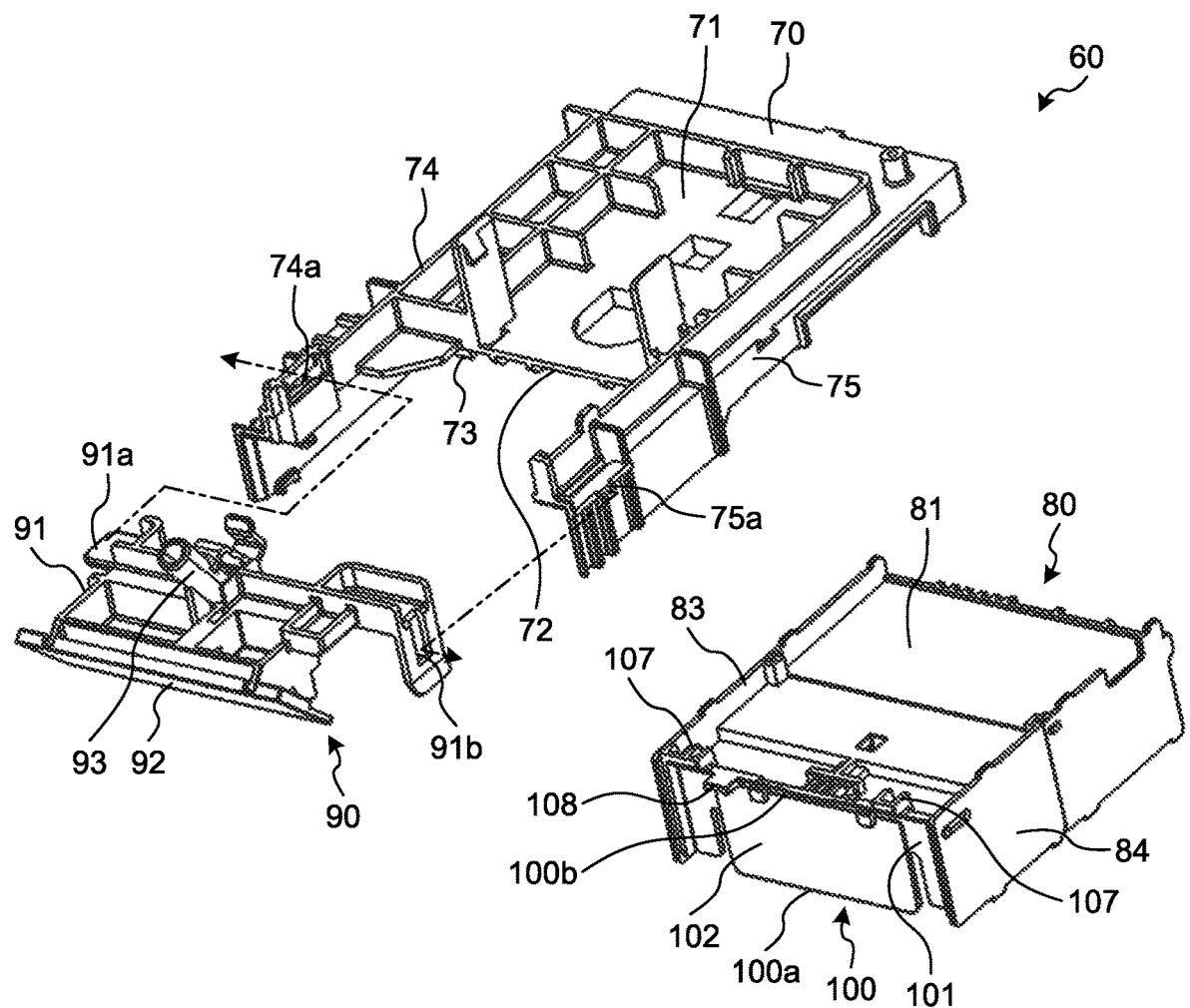
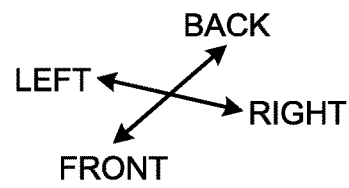

FRONT ←→ BACK

BEVERAGE EXTRACTION DEVICE

CROSS-REFERENCE TO RELATED APPLICATION(S)

This application is a continuation of International Application No. PCT/JP2017/042072, filed on Nov. 22, 2017 which claims the benefit of priority of the prior Japanese Patent Application No. 2016-249341, filed on Dec. 22, 2016 and Japanese Patent Application No. 2017-057663, filed on Mar. 23, 2017, the entire contents of which are incorporated herein by reference.

BACKGROUND

1. Technical Field

The present disclosure relates to a beverage extraction device, and more specifically relates to a beverage extraction device applied to a beverage server and a cup-type automatic beverage vending machine, for example.

2. Related Art

In the related art, as a beverage extraction device applied to a beverage server and a cup-type automatic beverage vending machine, for example, a beverage extraction device including a cylinder, a filter block, a cylinder head, and a scraper portion has been known.

The cylinder is an extraction container having a cylindrical shape. The filter block incorporates a filter, and is configured to open and close a lower-surface opening of the cylinder. The cylinder head is configured to open and close an upper-surface opening of the cylinder. The scraper portion is provided so as to be movable along the horizontal direction, and is configured to remove extraction residue placed on the filter of the filter block when being moved.

In the beverage extraction device thus configured extracts a beverage in a manner described below. Into the cylinder the lower-surface opening of which is closed with the filter block, beverage raw material and hot water are fed from a raw-material supply device and a hot-water supply device, respectively, through the upper-surface opening that has been opened. The beverage raw material and the hot water fed into the cylinder are stirred by air supplied into the cylinder from a first air-supply passage connected to the filter block. Subsequently, supply of the air from the first air-supply passage is stopped.

Subsequently, the upper-surface opening of the cylinder is closed by the cylinder head, air is supplied into the cylinder from a second air-supply passage connected to the cylinder head, and also an extraction passage connected to the filter block is opened. Consequently, the stirred liquid inside the cylinder is extracted as a beverage through the filter of the filter block, and is discharged outside through the extraction passage.

In the beverage extraction device described above, after the beverage is extracted and discharged, the filter block and the cylinder head are separated from the cylinder, and the scraper portion is moved along the horizontal direction, whereby extraction residue placed on the filter of the filter block is removed from the filter block in a scraped manner (see Japanese Patent No. 4760549, U.S. Pat. Nos. 8,371,211 B2, and 8,621,982 B2, for example).

SUMMARY

In the beverage extraction device described above, extraction residue placed on the filter is scraped by moving the scraper portion. In this process, the scraper portion is merely moved along the horizontal direction. Namely, the scraper portion is moved without changing the attitude of the scraper portion (see column 8, lines 43-44 in U.S. Pat. No. 8,371,211 B2, and column 8, lines 54-55 in U.S. Pat. No. 8,621,982 B2) Thus, part of the extraction residue may remain in a state of sticking to a surface of the scraper portion. Such extraction residue remaining on the surface of the scraper portion in this manner may cause mold, for example, to grow, which is insanitary and unfavorable.

In view of these circumstances, it is desirable to provide a beverage extraction device that makes it possible to favorably remove extraction residue while preventing the extraction residue from sticking to a scraper portion and remaining thereon.

In some embodiments, a beverage extraction device includes a mesh member having a disk shape in which a plurality of through holes are formed, the mesh member being movable along an axial direction of a cylinder that has a side surface having a cylindrical shape while being in contact with an inside surface of the cylinder, the beverage extraction device being configured to extract a beverage from beverage raw material and hot water that are fed into the cylinder by moving the mesh member and discharge the beverage outside the cylinder. The beverage extraction device further included: a cover member that is movable between a first position and a second position along a direction orthogonal to the axial direction of the cylinder; a scraper portion, an upper end portion of which is pivotally supported by the cover member with a lower end portion of the scraper portion being swingable along a vertical direction, that takes a basic attitude in which the lower end portion is positioned lower than the upper end portion under a normal condition, the lower end portion being configured to slide on the mesh member to remove an extraction residue placed on the mesh member when the cover member is moved from the first position toward the second position; and a contact member configured to come into contact with the scraper portion sliding on the mesh member to cause the scraper portion to take an attitude in which the lower end portion swings upward when the cover member approaches the second position.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3 is a perspective view illustrating the main components of the cover unit depicted in FIG. 1;

FIG. 4 is an exploded perspective view of the main components of the cover unit depicted in FIG. 1;

DETAILED DESCRIPTION

A preferred embodiment of a beverage extraction device according to the disclosure will now be described in detail with reference to the attached drawings.

Figure 1:
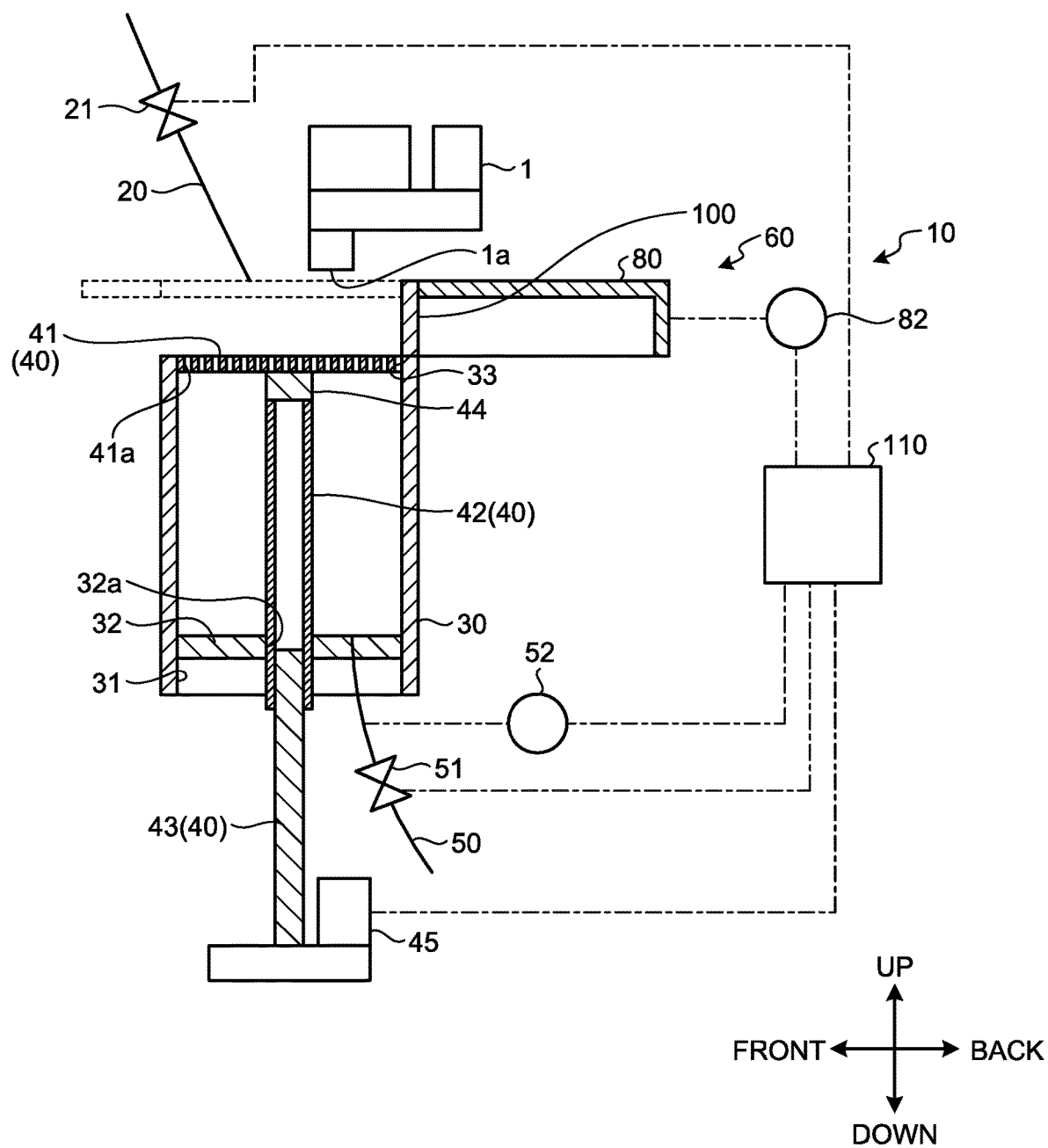
FIG. 1 is a schematic diagram schematically illustrating a beverage extraction device according to an embodiment of the disclosure.

FIG. 1 is a schematic diagram schematically illustrating the beverage extraction device according to the embodiment of the disclosure, in which part of the device is illustrated in cross-section.

This beverage extraction device 10 exemplified herein is a device applied to a beverage server and a cup-type automatic beverage vending machine, for example, that provide beverages such as coffee or tea, and configured to extract coffee beverage from a coffee raw material (ground beans: beverage raw material) supplied through a supply port 1a of a mill 1 and hot water supplied through a hot-water passage 20.

The hot-water passage 20 is arranged in front of the mill 1, and is configured to allow hot water supplied from a hot-water tank (not depicted) to pass therethrough. This hot-water passage 20 is provided with a hot-water supply valve 21 at a midpoint thereof. The hot-water supply valve 21 is a valve that is opened and closed in response to instructions given from a controller 110. The hot-water supply valve allows hot water to pass through the hot-water passage 20 when opened, and stops the hot water from passing through the hot-water passage 20 when closed.

The beverage extraction device 10 described above includes a cylinder 30, a piston unit 40, an extraction passage 50, and a cover unit 60.

The cylinder 30 is entirely made of metal, and has a bottomed cylindrical shape in which a lower-surface opening 31 formed at a lower surface thereof is closed with a bottom portion 32. The cylinder 30 is thus supported by a cylinder holder (not depicted), and the axial direction thereof corresponds to the vertical direction.

The piston unit 40 includes a mesh member 41, a feed nut 42, and a feed screw 43. The mesh member 41 is made of metal material, for example, and has a disk shape. A side surface of this mesh member 41 is in contact with an inner surface of the cylinder 30, and a plurality of through holes 41a are formed in the mesh member so as to vertically penetrate.

The feed nut 42 is an elongated member the longitudinal direction of which corresponds to the vertical direction, and is attached to a central portion of the lower surface of the mesh member 41 with an attachment block 44 interposed therebetween. This feed nut 42 has a cylindrical shape an opening of which at its upper surface is closed with the attachment block 44, and penetrates through a nut hole 32a formed in a central portion of the bottom portion 32. The outside diameter of this feed nut 42 is slightly smaller than the inside diameter of the nut hole 32a, and airtightness is achieved by providing packing, for example, in a clearance between the feed nut 42 and the nut hole 32a.

The feed screw 43 is an elongated member the longitudinal direction of which corresponds to the vertical direction, and part thereof has been inserted into the feed nut 42. The outside surface of this feed screw 43 to be inserted into the feed nut 42 is screwed with the inside surface of the feed nut 42. A lower end portion of the feed screw 43 is connected to a piston motor 45. The piston motor 45 is driven so as to be rotatable in normal and reverse rotation directions in response to instructions given from the controller 110.

Thus, when the piston motor 45 is driven in the normal rotation direction, the feed screw 43 is rotated clockwise about its axis when viewed from above, for example, whereby the feed nut 42 screwed with the feed screw is moved downward. When the piston motor 45 is driven in the reverse rotation direction, the feed screw is rotated counterclockwise about the axis when viewed from above, for example, whereby the feed nut 42 is moved upward.

The feed nut 42 is moved along the vertical direction by the rotation of the feed screw 43 in this manner, whereby the mesh member 41 to which the feed nut 42 is attached with the attachment block 44 interposed therebetween can be moved close to and away from the bottom portion 32 with the side surface of the mesh member being in contact with the inside surface of the cylinder 30, that is, can be moved along the axial direction of the cylinder 30.

The extraction passage 50 is connected to the bottom portion 32 so as to penetrate through an extraction hole (not depicted) formed in the bottom portion 32. This extraction passage 50 allows a coffee beverage extracted inside the cylinder 30 to pass therethrough to be discharged into a beverage container C (see FIG. 20). This extraction passage 50 is provided with an extraction valve 51 and a pressure sensor 52.

The extraction valve 51 is a valve that is opened and closed in response to instructions given from the controller 110. The extraction valve allows a coffee beverage to pass through the extraction passage 50 when opened, and stops the coffee beverage from passing through the extraction passage 50 when closed.

The pressure sensor 52 is provided upstream of the extraction valve 51. This pressure sensor 52 detects pressure in the cylinder 30 at an area lower than the mesh member 41. This pressure sensor 52 gives a detected pressure as a pressure signal to the controller 110.

Figure 2:
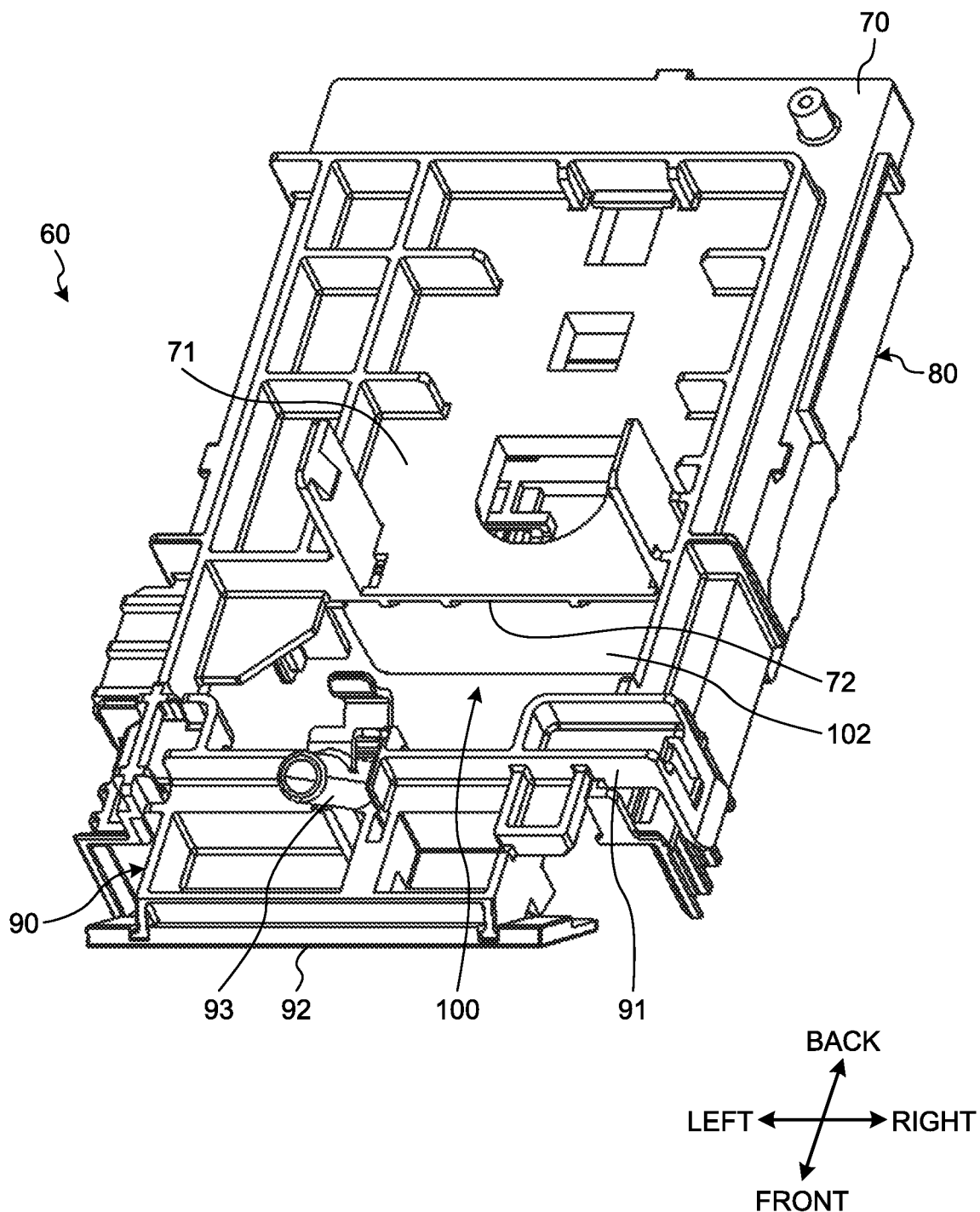
FIG. 2 is a perspective view illustrating main components of a cover unit depicted in FIG. 1.

FIG. 2 to FIG. 4 each illustrate main components of the cover unit 60 depicted in FIG. 1. FIG. 2 and FIG. 3 are perspective views, and FIG. 4 is an exploded perspective view. The cover unit 60 exemplified herein includes a cover body 70, a cover member 80, and a contact member 90.

The cover body 70 is formed of resin material, for example. This cover body 70 is arranged in an area above the cylinder 30, and has a box shape front and lower portions of which are open. In an upper portion 71 of the cover body 70 at its front end portion, a cutout 72 is formed so as to extend to a front portion thereof.

To the upper portion 71 of the cover body 70 thus configured, the mill 1 described above is attached, and the supply port 1a of the mill 1 faces the cutout 72. On a lower surface of the upper portion 71 of the cover body 70, an attitude return projection 73 is formed so as to protrude downward.

The cover member 80 is formed of resin material, for example, and has a box shape lower and front wall portions of which are open. An upper wall portion 81 of this cover member 80 has a sufficient size for covering an upper-surface opening 33 of the cylinder 30.

The cover member 80 thus configured is connected, below the cover body 70, to a cover motor 82. The cover motor 82 is driven so as to be rotatable in the normal and reverse rotation directions in response to instructions given from the controller 110.

When the cover motor 82 is driven in the normal rotation direction, the cover member 80 is moved backward to be disposed at a fully opened position (first position) where the upper-surface opening 33 of the cylinder 30 is fully opened as indicated by continuous lines in FIG. 1. When the cover motor 82 is driven in the reverse rotation direction, the cover member is moved forward to be disposed at a fully closed position (second position) where the upper-surface opening 33 of the cylinder 30 is fully closed as indicated by the dashed lines in FIG. 1. In other words, the cover member 80 is provided so as to be movable, between the fully closed position where the upper-surface opening 33 is fully closed and the fully opened position where the upper-surface opening 33 is fully opened, along a direction (the front-back direction) orthogonal to the axial direction (the vertical direction) of the cylinder 30.

Although details will be described later, the cover member 80 is also moved to a midway position (third position) where the upper-surface opening 33 is partially closed between the fully opened position and the fully closed position.

Figure 5:
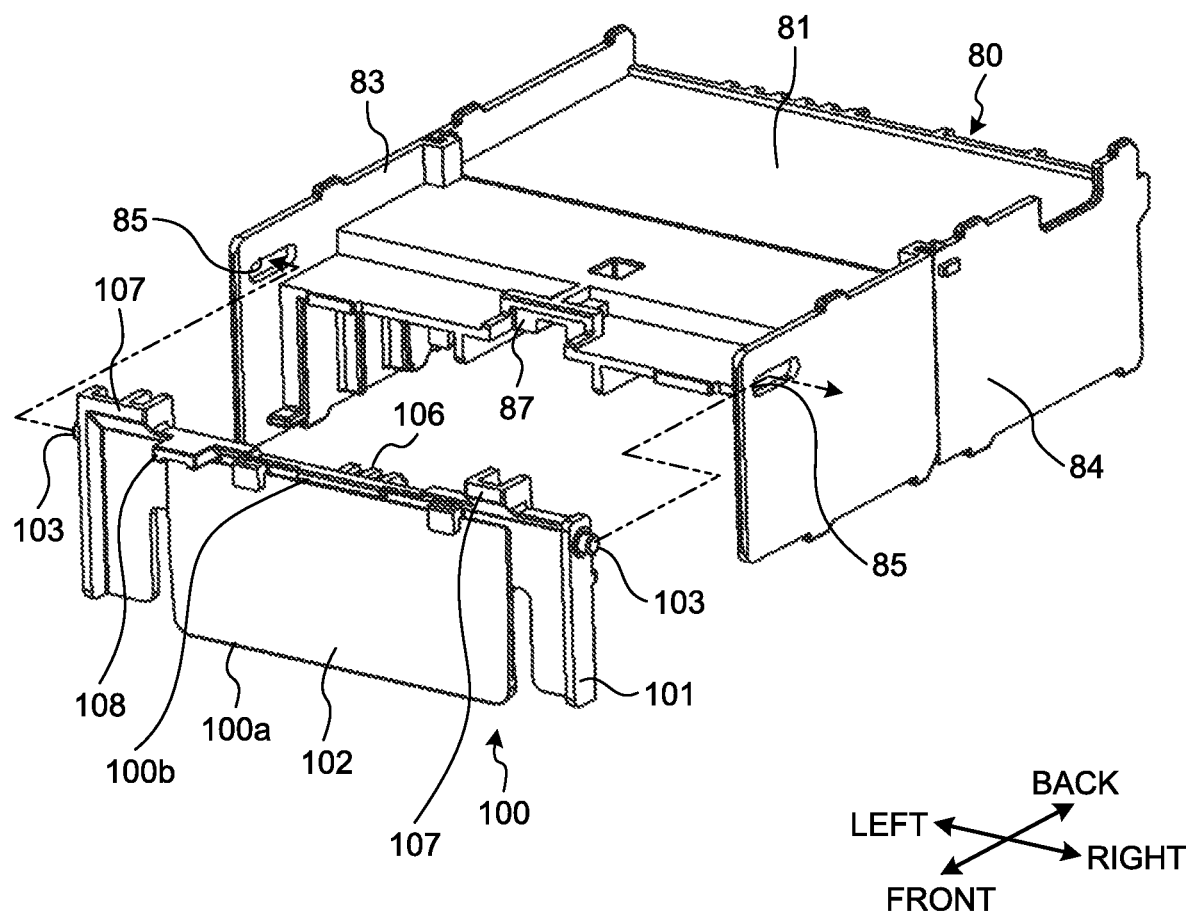
FIG. 5 is an exploded perspective view of a cover member depicted in FIG. 4.

The cover member 80 includes a scraper portion 100. As depicted in FIG. 5, the scraper portion 100 is formed in a flat-plate shape as a whole in which a rectangular scraper 102 is supported by a scraper support member 101 having a long length the longitudinal direction of which corresponds to the left-right direction.

The scraper portion 100 thus configured is provided to the cover member 80 in a manner described below. Specifically, engaging projections 103 that are formed in a protruding manner on both left and right end surfaces of the scraper support member 101 at its upper end portion are inserted into a pair of left and right engagement long holes 85 that are formed on a left wall portion 83 and a right wall portion 84 of the cover member 80, respectively, and the longitudinal direction of these holes corresponds to the front-back direction. Thus, the scraper portion 100 is provided to the cover member 80 so as to be swingable about the axis of the engaging projections 103. In other words, an upper end portion 100b of the scraper portion 100 is pivotally supported by the cover member 80 so that a lower end portion 100a thereof can be swung along the vertical direction.

Figure 6:
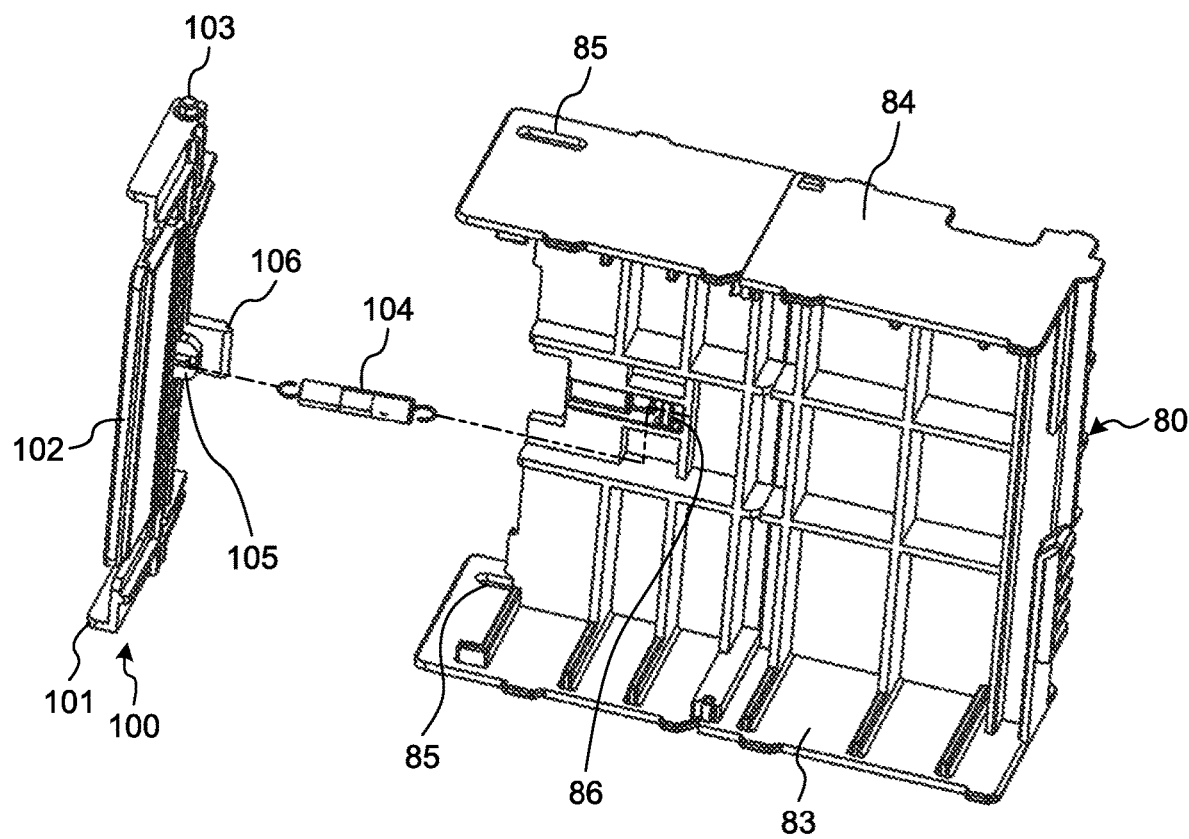
FIG. 6 is an exploded perspective view of the cover member depicted in FIG. 4.

Between the scraper portion 100 thus configured and the cover member 80, a scraper spring 104 is interposed. As depicted in FIG. 6, one end of the scraper spring 104 is hooked on a hooked piece 105 that is formed on the scraper support member 101 so as to protrude backward, and the other end thereof is hooked on a hooked rod 86 that is formed on the cover member 80, whereby the scraper portion 100 is constantly biased backward.

Consequently, the scraper portion 100 is biased by the scraper spring 104, and a first protruding piece 106 that is formed on the scraper support member 101 above the hooked piece 105 is in contact with a central portion 87 formed on a front end surface of the upper wall portion 81 of the cover member 80. This enables the scraper portion to be kept in a basic attitude in which the lower end portion 100a is positioned below the upper end portion 100b as depicted in FIG. 2 to FIG. 4.

On the scraper support member 101, two second protruding pieces 107 and one third protruding piece 108 are formed. When the scraper portion 100 is in the basic attitude, the second protruding pieces protrude upward and the third protruding piece protrudes forward. This third protruding piece 108 is formed on the right side of the left second protruding piece 107, and its position in the left-right direction corresponds to the attitude return projection 73 described above.

The scraper portion 100 thus configured closes the opening at the front wall portion of the cover member 80 when being brought into the basic attitude. Furthermore, the vertical dimension of the scraper portion is determined so that the lower end portion 100a of the scraper 102 can be brought into sliding contact with the upper surface of the cylinder 30 when the cover member 80 is moved between the fully opened position and the fully closed position.

The contact member 90 includes a contact body 91 and a removing member 92. The contact body 91 is a long member the longitudinal direction of which corresponds to the left-right direction. A left locking piece 91a having a tongue shape formed on a left end portion of this contact body 91 is inserted into a left engagement hole 74a formed in a front end portion of a left portion 74 of the cover body 70, and a right locking piece 75a formed on a front end portion of a right portion 75 of this cover body 70 is inserted into a right engagement hole 91b formed in a right end portion of the contact body. Thus, the contact body is provided so as to be separated apart from the upper portion 71 of the cover body 70 and extend astride the left portion 74 and the right portion 75.

Figure 7:
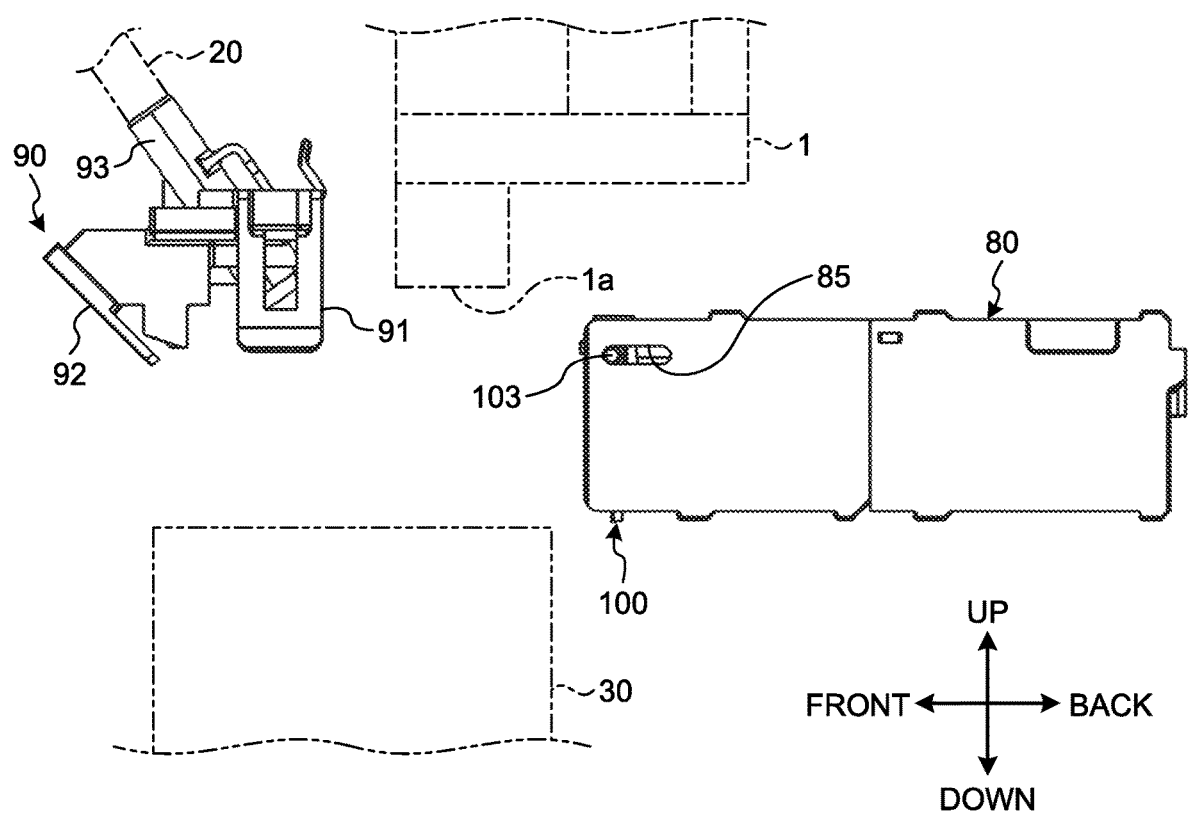
FIG. 7 is a schematic diagram schematically illustrating a positional relation between the cover member depicted in FIGS. 2 to 6 and a contact member.
Figure 8:
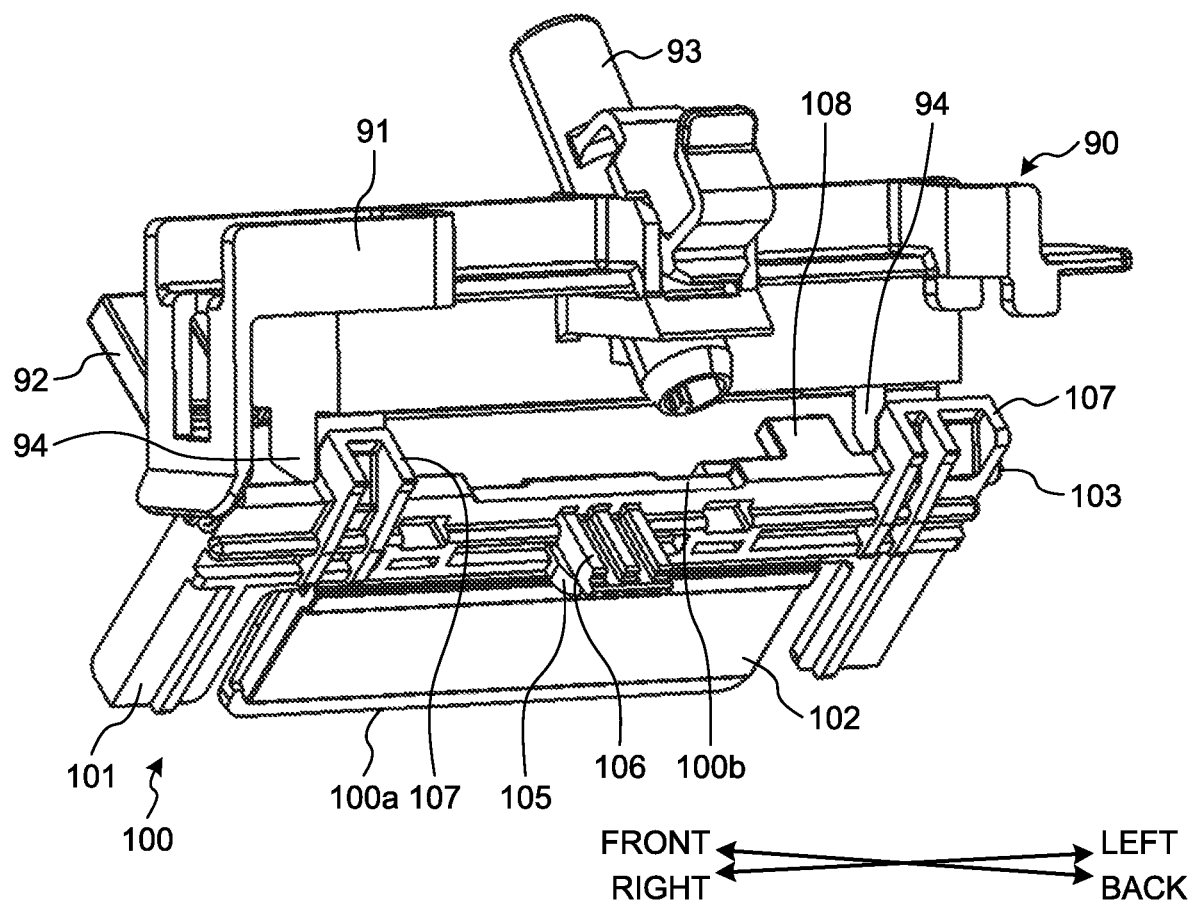
FIG. 8 is a perspective view illustrating a state in which a scraper portion and a contact member are in contact with each other.

The contact body 91 thus configured is provided with a nozzle 93 and contact projections 94 (see FIG. 8). As depicted in FIG. 7, the nozzle 93 is connected to the hot-water passage 20, and is configured to discharge hot water supplied through the hot-water passage 20 toward the cylinder 30. The contact projections 94 are a pair of left and right projections that protrude downward from both left and right end portions of the contact body 91.

The removing member 92 is a soft member formed of silicone, for example, and has a rectangular shape. This removing member 92 is supported by the contact body 91 so as to be inclined gradually downward toward the back.

Figure 9:
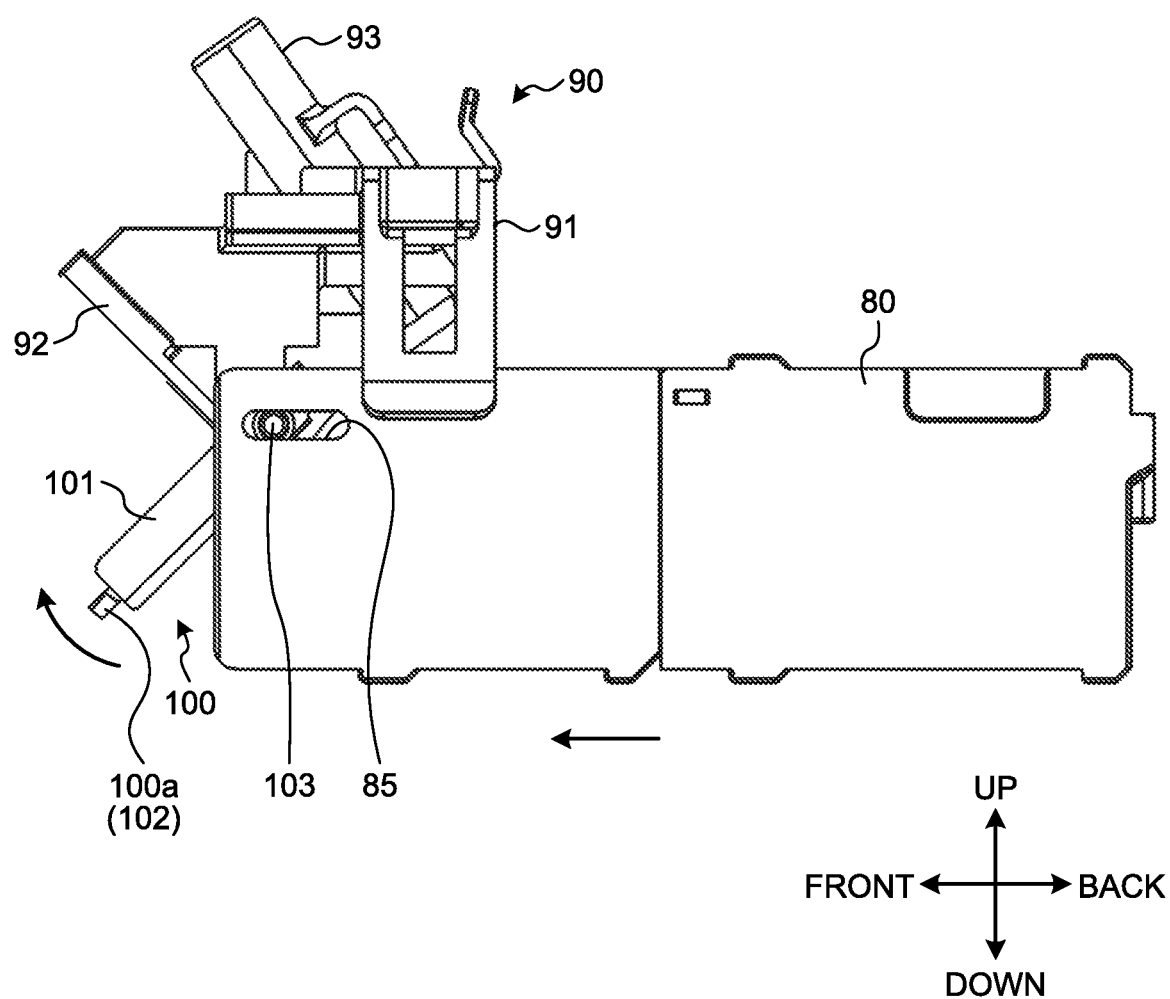
FIG. 9 is a schematic diagram illustrating a state in which the cover member approaches a fully closed position.

The following describes operation of the cover unit 60. In a standby state, the cover member 80 is positioned at the fully opened position as depicted in FIG. 7. When the cover motor 82 is driven in the reverse rotation direction, the cover member 80 is moved forward. Accordingly, when the cover member 80 approaches the fully closed position, the second protruding pieces 107 of the scraper portion 100 (scraper support member 101) come into contact with the respective contact projections 94 as depicted in FIG. 8, whereby the lower end portion 100a of the scraper portion 100 is swung upward about the axis of the engaging projections 103 thereof against the biasing force of the scraper spring 104 while the engaging projections 103 are being displaced backward in the engagement long holes 85 as depicted in FIG. 9.

Figure 10:
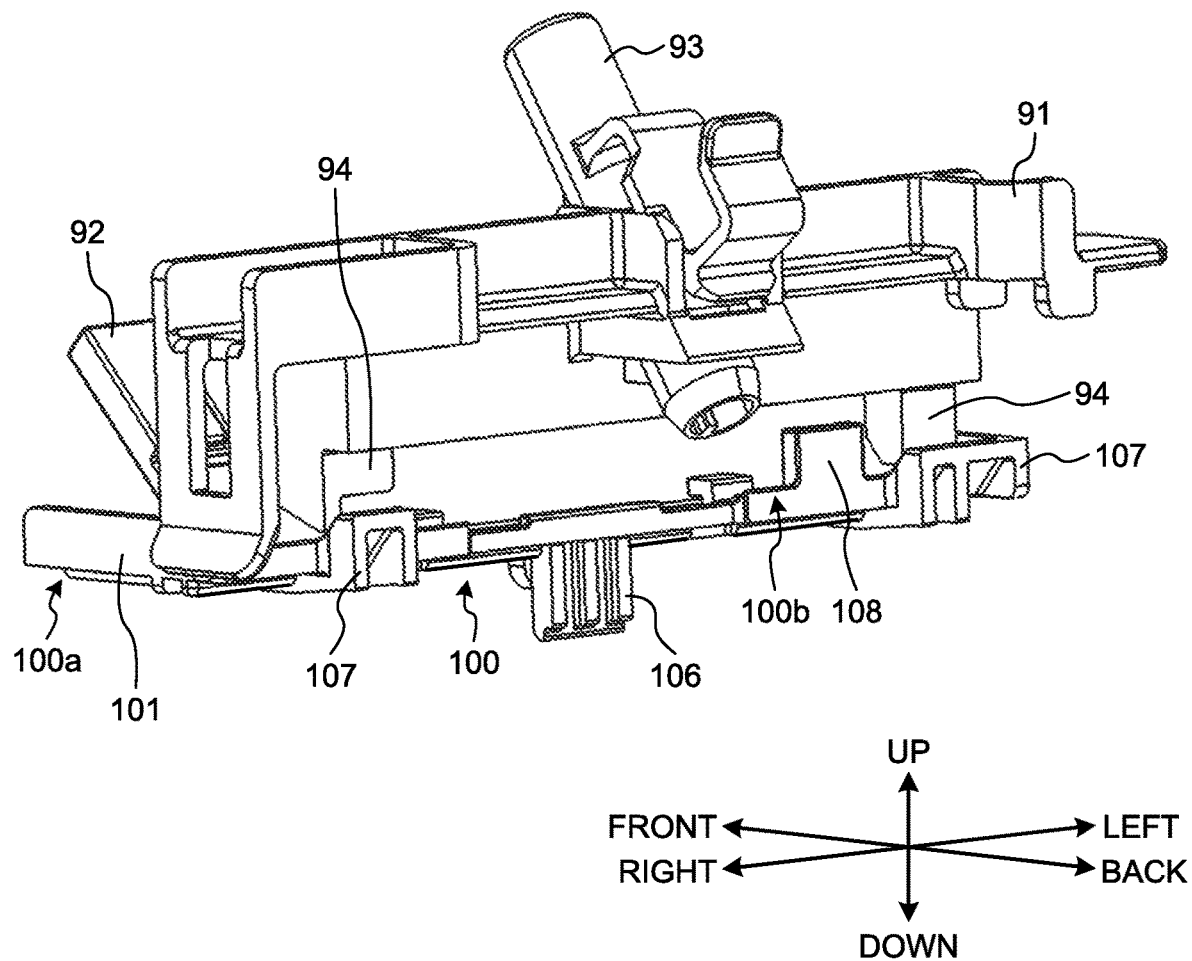
FIG. 10 is a perspective view illustrating a state in which the scraper portion and the contact member are in contact with each other.
Figure 11:
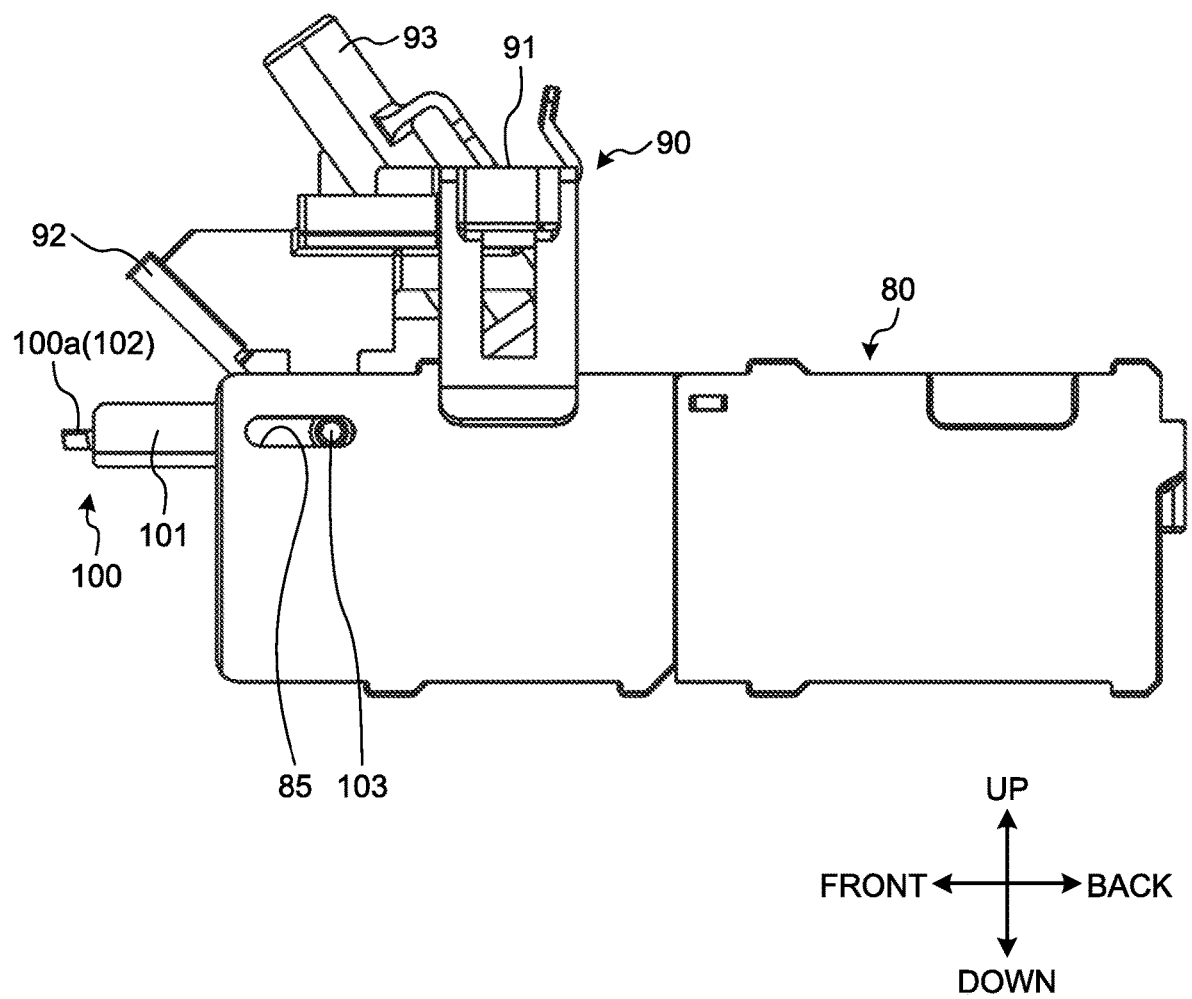
FIG. 11 is a schematic diagram illustrating a state in which the cover member has reached the fully closed position.
Figure 12:
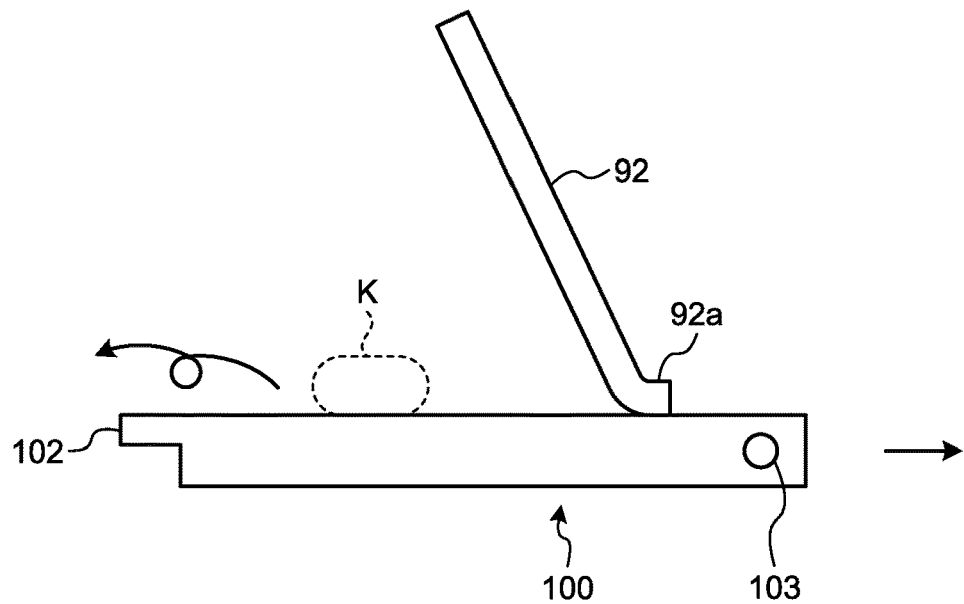
FIG. 12 is an explanatory diagram illustrating a state of contact between the scraper portion kept in a horizontal attitude and a removing member.

When the cover member 80 has reached the fully closed position, the scraper portion 100 is caused to take a horizontal attitude in which the lower end portion 100a is positioned at the same height level as the upper end portion 100b as depicted in FIG. 10. In this case, as depicted in FIG. 11, the biasing force of the scraper spring 104 acts backward with the engaging projections 103 being in contact with rear peripheral portions of the engagement long holes 85, whereby the horizontal attitude of the scraper portion 100 is kept. At this time, the third protruding piece 108 protrudes upward. In a state in which the scraper portion 100 is kept in the horizontal attitude in this manner, a distal end portion 92a of the removing member 92 is in contact with the surface of the scraper 102 in a curved manner as depicted in FIG. 12.

Subsequently, when the cover motor 82 is driven in the normal rotation direction whereby the cover member 80 is moved backward, the scraper portion 100 is moved backward together with the cover member 80 while being kept in the horizontal attitude. Consequently, the surface of the scraper 102 comes into sliding contact with the distal end portion 92a of the removing member 92.

Figure 13:
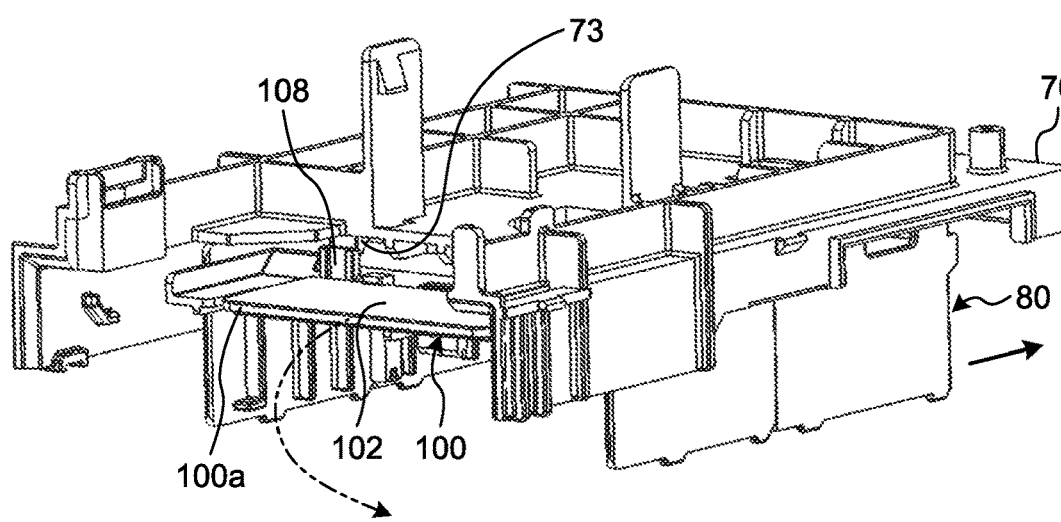
FIG. 13 is a perspective view illustrating a state in which the cover member is being moved from the fully closed position toward a fully opened position.

Subsequently, as depicted in FIG. 13, during backward movement of the cover member 80, the third protruding piece 108 comes into contact with the attitude return projection 73 from the front side, whereby the lower end portion 100a is swung downward and the scraper portion 100 is kept in the basic attitude by the biasing force of the scraper spring 104.

As described above, in the cover unit 60, the cover member 80 is moved from the fully opened position toward the fully closed position to reach the fully closed position, whereby the scraper portion 100 is swung to be brought from the basic attitude into the horizontal attitude. When the cover member 80 is moved from the fully closed position to the fully opened position, the distal end portion 92a of the removing member 92 is brought into sliding contact with the surface of the scraper 102, and then the scraper portion 100 is swung from the horizontal attitude to the basic attitude.

Figure 14:
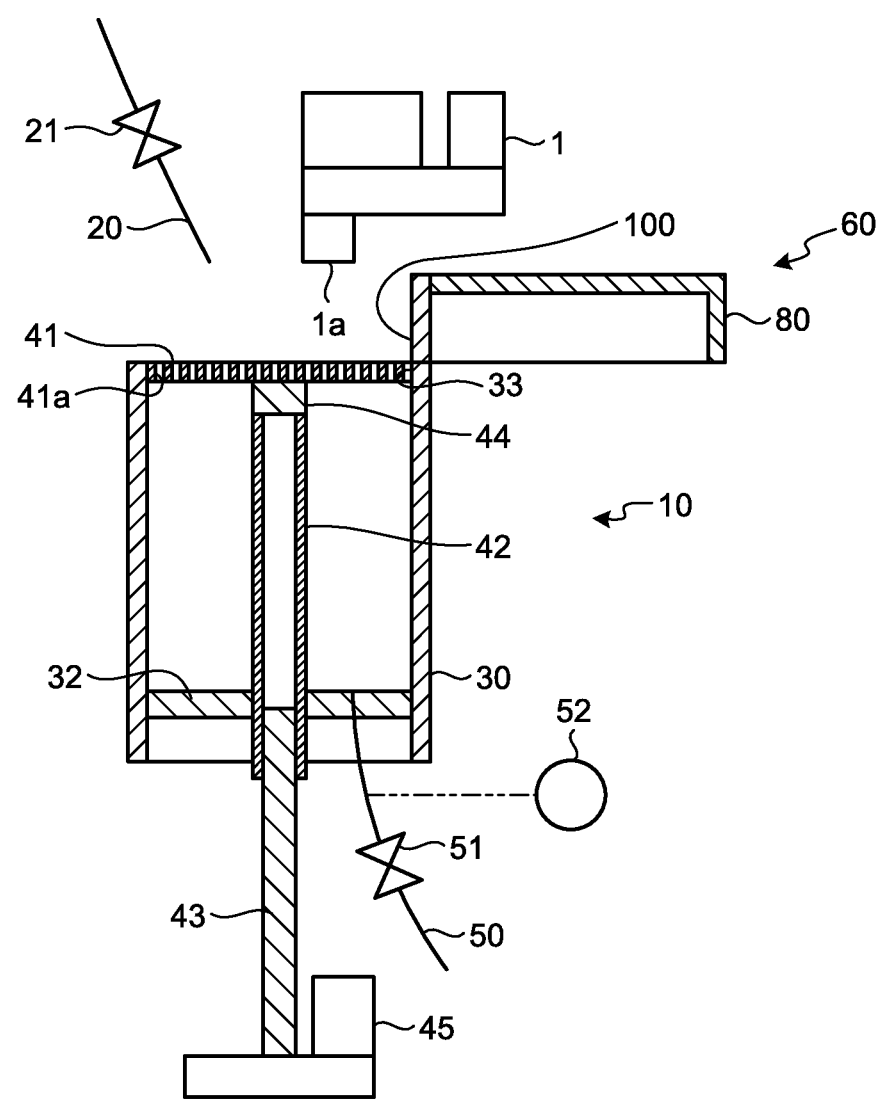
FIG. 14 is an explanatory diagram illustrating a procedure of beverage extraction operation of the beverage extraction device depicted in FIG. 1.

The following describes extracting operation of the beverage extraction device 10 having the above-described structure. In a standby state, as depicted in FIG. 14, the mesh member 41 is disposed at a top dead point in the same level as the upper surface of the cylinder 30, whereby the upper-surface opening 33 is closed, and the cover member 80 is disposed at the fully opened position. The hot-water supply valve 21 and the extraction valve 51 are both closed.

In this standby state, when a start instruction is given, the controller 110 gives a drive instruction to the piston motor 45 to drive the piston motor 45 in the normal rotation direction. Accordingly, the feed screw 43 is rotated clockwise when viewed from above, whereby the mesh member 41 is moved downward together with the feed nut 42.

Figure 15:
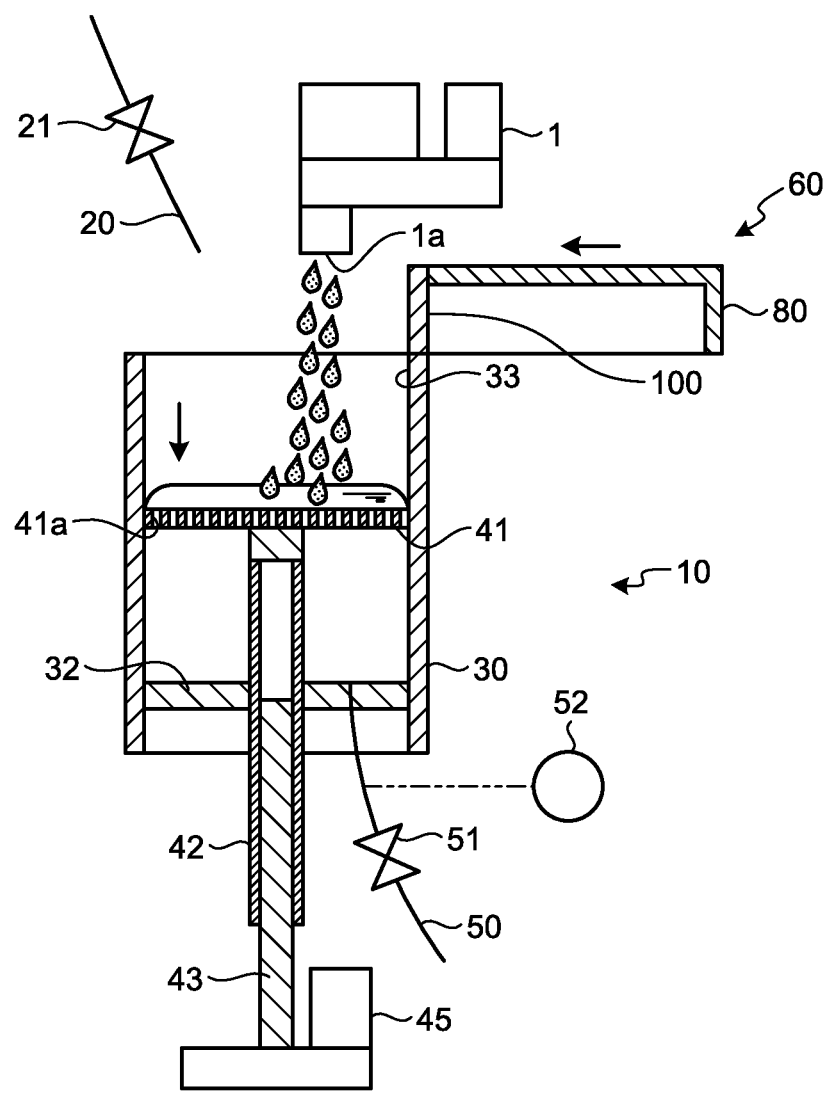
FIG. 15 is an explanatory diagram illustrating the procedure of the beverage extraction operation of the beverage extraction device depicted in FIG. 1.

When the mesh member 41 has been moved to an intermediate position separated apart from the bottom portion 32 and the upper-surface opening 33, the controller 110 gives a drive stop instruction to the piston motor 45. Consequently, the mesh member 41 is disposed at the intermediate position as depicted in FIG. 15.

When coffee raw material is fed into the cylinder 30 from the mill 1, the coffee raw material is accumulated on the upper surface of the mesh member 41. When the feeding of the coffee raw material from the mill 1 has been completed, the controller 110 gives a drive instruction to the cover motor 82 to drive the cover motor 82 in the reverse rotation direction. Accordingly, the cover member 80 is moved forward from the fully opened position.

Figure 16:
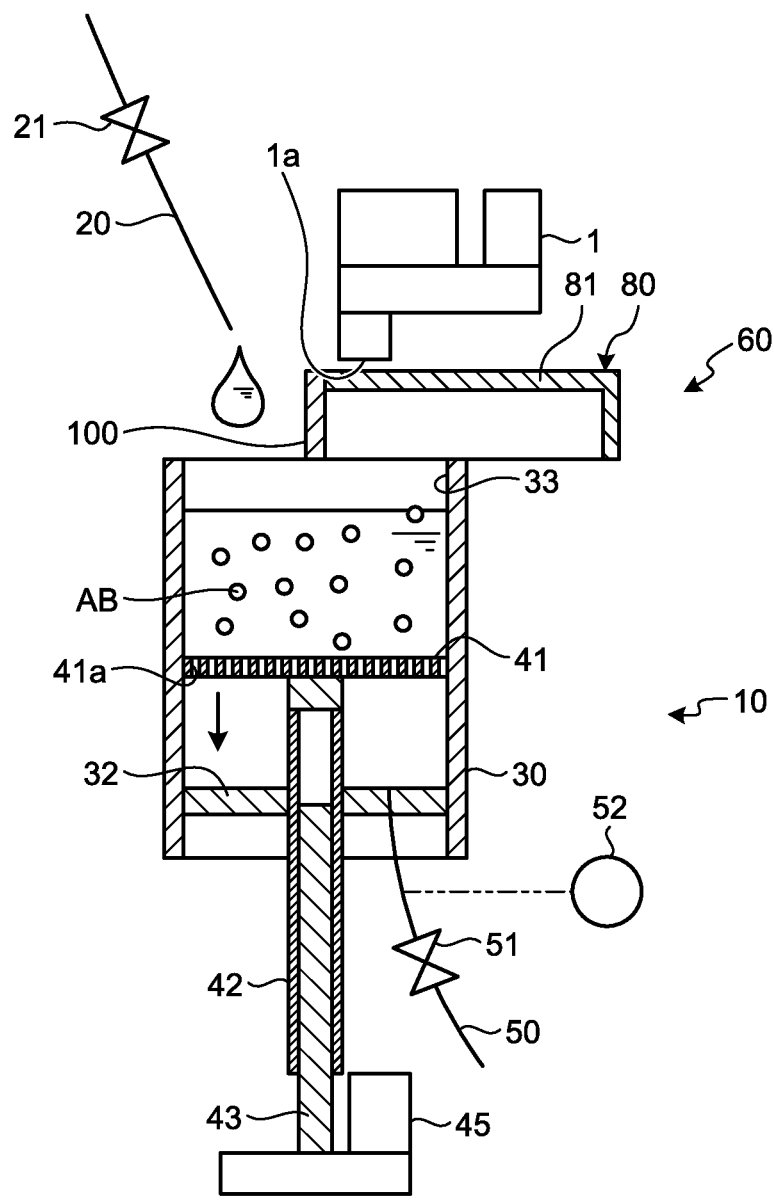
FIG. 16 is an explanatory diagram illustrating the procedure of the beverage extraction operation of the beverage extraction device depicted in FIG. 1.

When the cover member 80 has been moved to the midway position where the upper-surface opening 33 is partially closed, the controller 110 gives a drive stop instruction to the cover motor 82. Consequently, the cover member 80 is disposed at the midway position as depicted in FIG. 16. In this case, the cover member 80 closes the supply port 1a of the mill 1 with the upper wall portion 81 thereof.

After the cover member 80 is disposed at the midway position, the controller 110 gives an open instruction to the hot-water supply valve 21 to open the hot-water supply valve 21. Accordingly, hot water from the hot-water tank is fed into the cylinder 30 through the hot-water passage 20 and the nozzle 93. When a period during which the hot-water supply valve 21 is open has reached a predetermined period, the controller 110 gives a close instruction to the hot-water supply valve 21 to close the hot-water supply valve 21. Accordingly, into the cylinder 30, a predetermined amount of hot water is fed.

In the cylinder 30 into which the coffee raw material and the hot water have been fed in this manner, air remains at a lower portion of the mesh member 41 disposed at the intermediate position because the extraction valve 51 is closed.

After this feeding, the controller 110 gives a drive instruction to the piston motor 45 to drive the piston motor 45 in the normal rotation direction. Accordingly, the feed screw 43 is rotated clockwise when viewed from above, whereby the mesh member 41 is moved downward together with the feed nut 42. As the mesh member 41 is moved downward in this manner, the pressure in the cylinder 30 at the lower portion of the mesh member 41 increases, and consequently becomes a positive pressure.

This positive-pressure air at the lower portion of the mesh member 41 passes through the through holes 41a of the mesh member 41 to form air bubbles AB, and these air bubbles AB stir the coffee raw material and the hot water. This stirring of coffee raw material and hot water is performed until the mesh member 41 reaches a bottom dead point where the mesh member is closest to the bottom portion 32.

The pressure in the cylinder 30 at the lower portion of the mesh member 41 is detected by the pressure sensor 52, and the detection result is given as a pressure signal to the controller 110. Thus, the controller 110 may perform PWM control on the piston motor 45 such that a pressure value (pressure result) given from the pressure sensor 52 becomes a predetermined pressure value set in advance.

Figure 17:
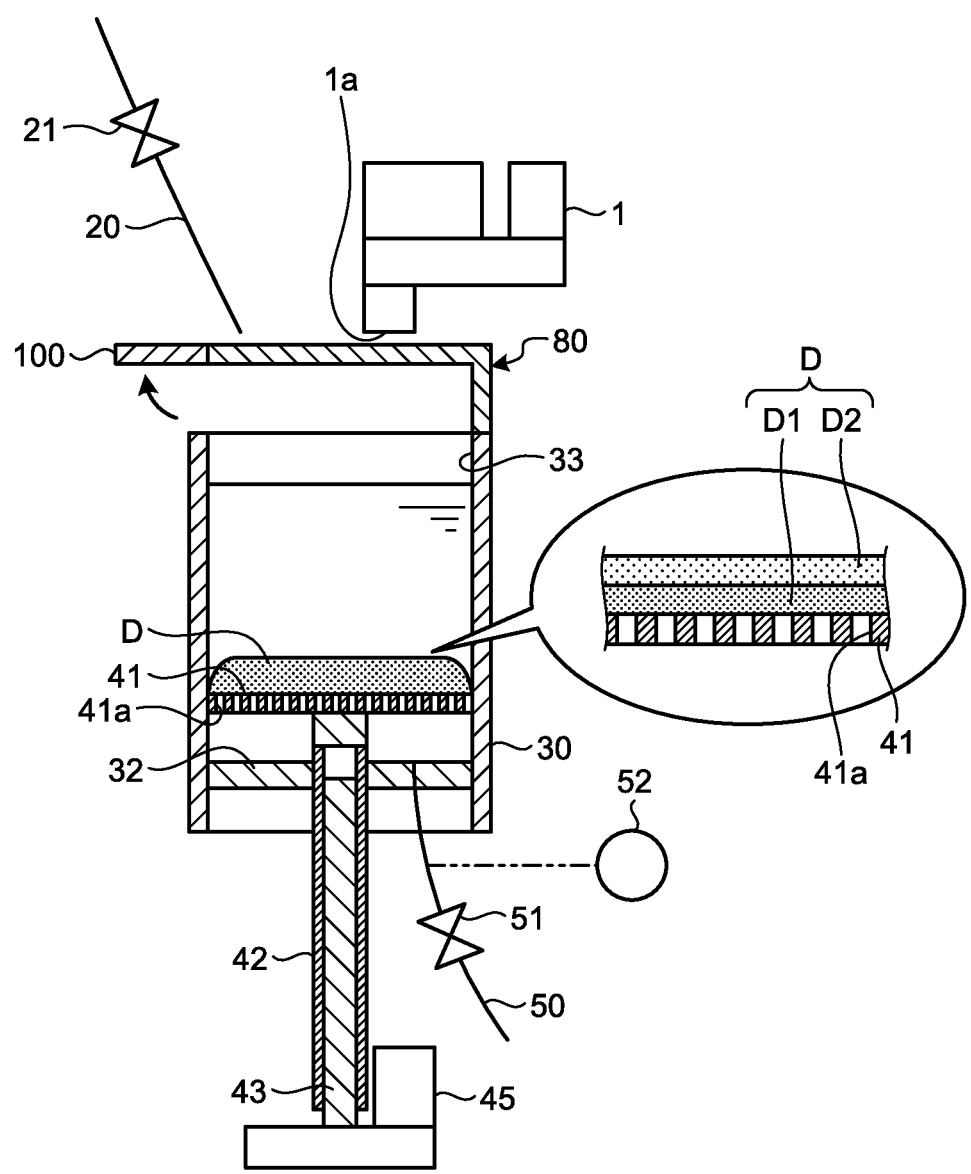
FIG. 17 is an explanatory diagram illustrating the procedure of the beverage extraction operation of the beverage extraction device depicted in FIG. 1.

As depicted in FIG. 17, when the mesh member 41 has reached the bottom dead point, the controller 110 gives a drive stop instruction to the piston motor 45. This controller 110 gives a drive instruction to the cover motor 82 to drive the cover motor 82 in the reverse rotation direction. Accordingly, the cover member 80 is moved forward from the midway position to the fully closed position. When the cover member 80 has reached the fully closed position in this manner, the scraper portion 100 is swung to be kept in the horizontal attitude as described above.

Subsequently, the controller 110 causes the mesh member 41 to wait at the bottom dead point until a predetermined period has elapsed since the controller gave the drive stop instruction to the piston motor 45.

Thus, coffee raw material obtained after the stirring of coffee raw material and hot water settles to form a deposit D on the upper surface of the mesh member 41. As depicted in an enlarged view in FIG. 17, fine-powder coffee raw material (hereinafter, also called "fine-powder raw material") D1 settles on the upper surface of the mesh member 41, and coffee raw material (hereinafter, also called "powder raw material") D2 the diameter of which is larger than that of the fine-powder raw material D1 settles on the upper portion of the fine-powder raw material D1.

The controller 110 gives a drive instruction to the piston motor 45 to drive the piston motor 45 in the reverse rotation direction. Accordingly, the feed screw 43 is rotated counterclockwise when viewed from above, whereby the mesh member 41 is moved upward together with the feed nut 42.

Figure 18:
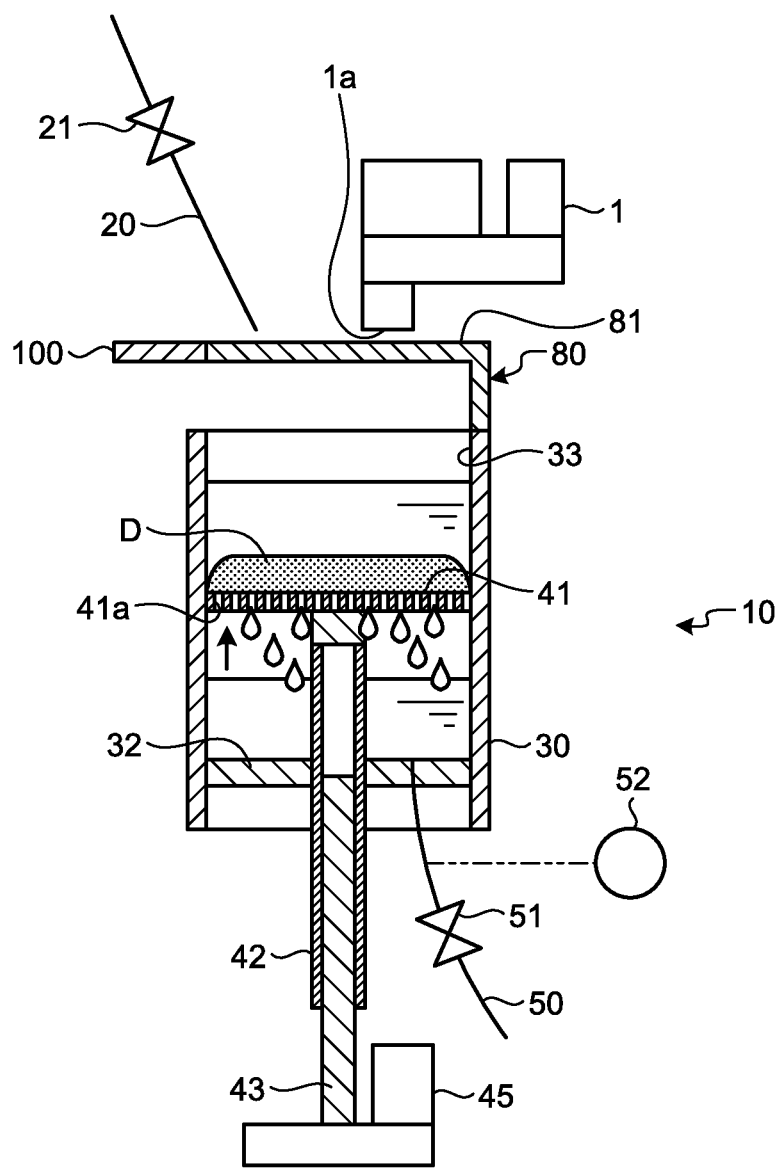
FIG. 18 is an explanatory diagram illustrating the procedure of the beverage extraction operation of the beverage extraction device depicted in FIG. 1.

As depicted in FIG. 18, when the mesh member 41 is moved upward in this manner, liquid obtained by stirring the coffee raw material and the hot water passes through the through holes 41a, whereby a coffee beverage can be extracted below the mesh member 41.

In this case, the stirred liquid passes through the deposit on the mesh member 41, and thus the extracted coffee beverage is filtered. The controller 110 preferably performs the PWM control on the piston motor 45 such that a pressure value (pressure result) given from the pressure sensor 52 becomes the predetermined pressure value set in advance.

Subsequently, the controller 110 gives a drive instruction to the cover motor 82 to drive the cover motor 82 in the normal rotation direction. Accordingly, the cover member 80 is moved backward from the fully closed position. During this movement toward the fully opened position, the third protruding piece 108 comes into contact with the attitude return projection 73 from the front side, whereby the scraper portion 100 is swung downward, and is kept in the basic attitude.

When the cover member 80 has been moved to the fully opened position, the controller 110 gives a drive stop instruction to the cover motor 82. Consequently, the cover member 80 is disposed at the fully opened position.

Figure 19:
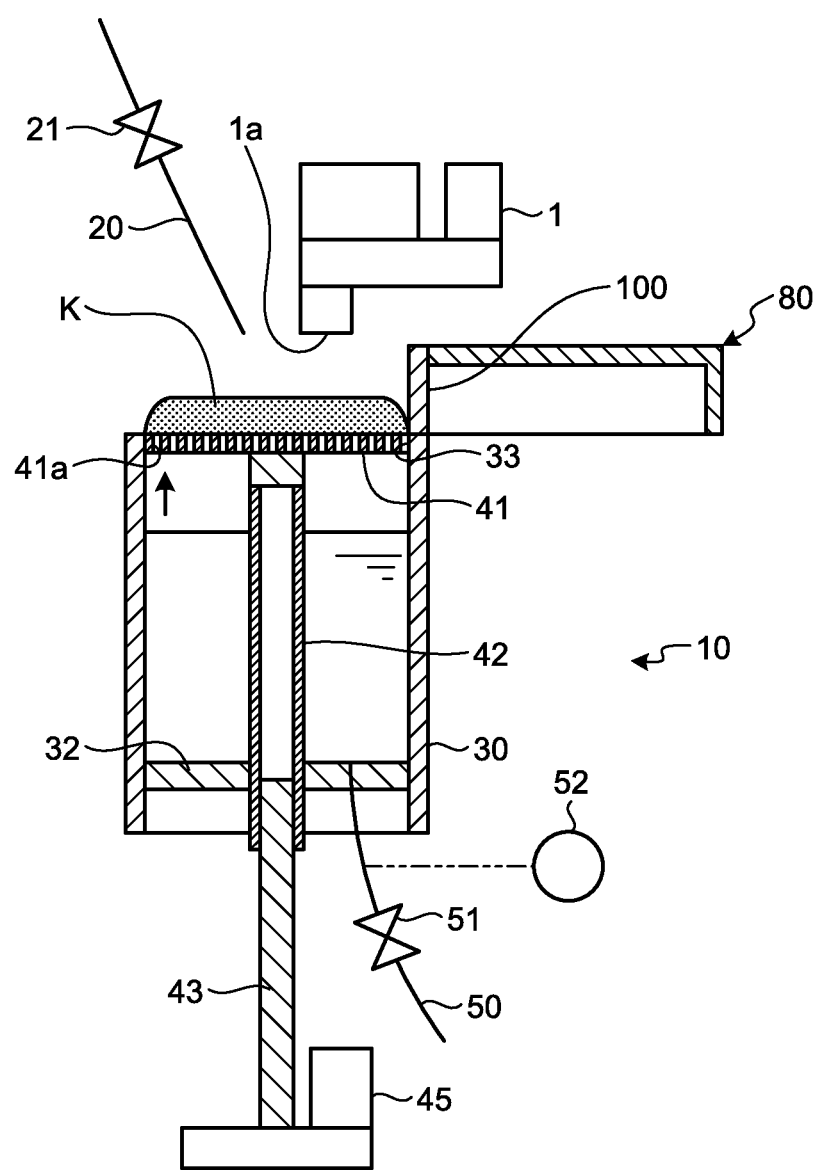
FIG. 19 is an explanatory diagram illustrating the procedure of the beverage extraction operation of the beverage extraction device depicted in FIG. 1.

As depicted in FIG. 19, when the mesh member 41 has been moved to the top dead point, the controller 110 gives a drive stop instruction to the piston motor 45. At this time, on the upper surface of the mesh member 41, extraction residue K is placed.

Figure 20:
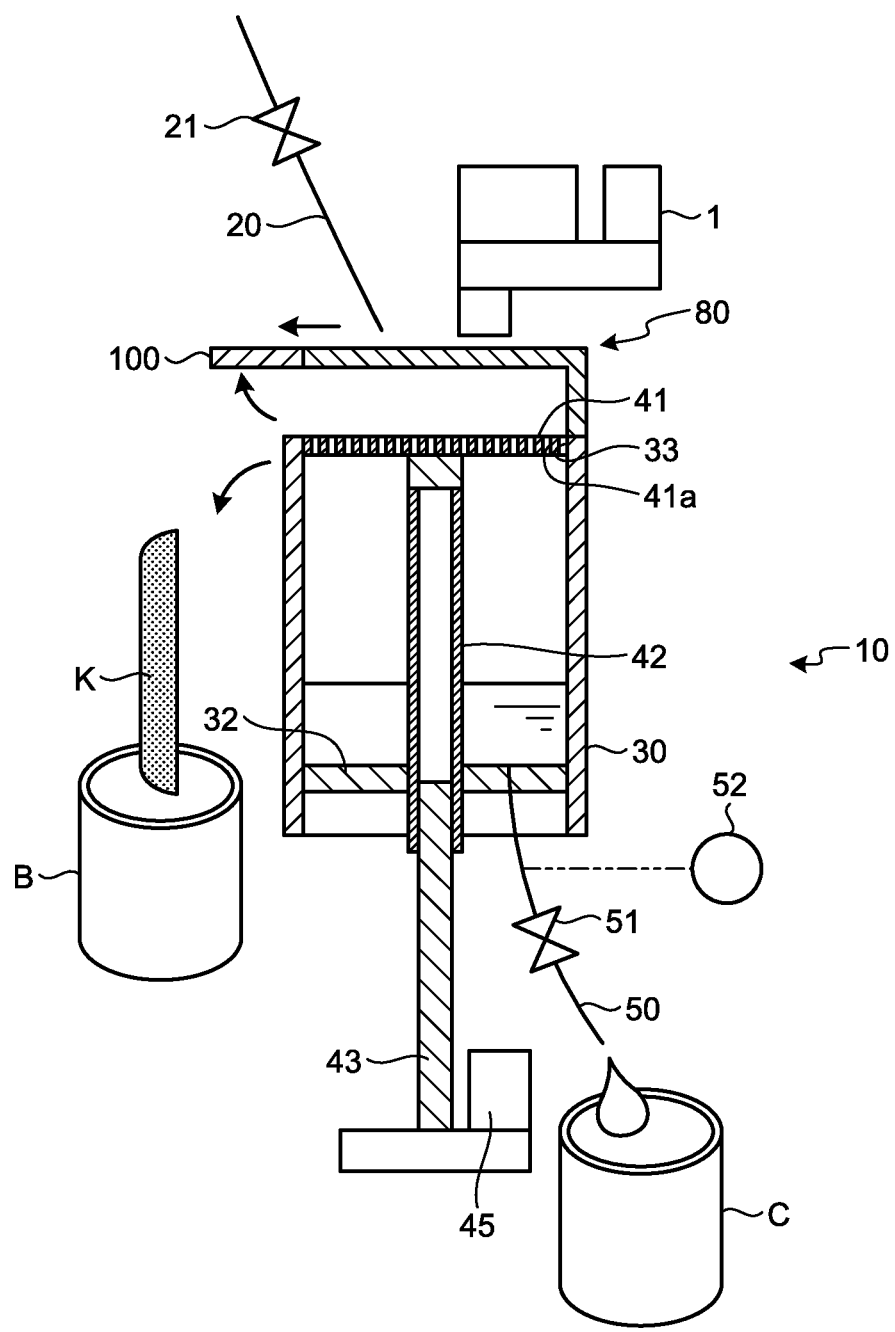
FIG. 20 is an explanatory diagram illustrating the procedure of the beverage extraction operation of the beverage extraction device depicted in FIG. 1.

Subsequently, the controller 110 gives a drive instruction to the cover motor 82 to drive the cover motor 82 in the reverse rotation direction. Accordingly, the cover member 80 is moved forward from the fully opened position. In this case, the scraper portion 100 of the cover member 80 slides on the upper surface of the mesh member 41 at the top dead point while being kept in the basic attitude, thereby scraping the extraction residue K placed on the upper surface of the mesh member 41. Consequently, as depicted in FIG. 20, the extraction residue K can be collected in a residue receptacle B disposed in front of the cylinder 30. Particularly because the scraper portion 100 is swung from the basic attitude to the horizontal attitude when approaching the fully closed position as described above, the extraction residue K sticking to a surface of the scraper 102 can be released into the residue receptacle B by centrifugal force generated by this swinging. When the cover member 80 has been moved to the fully closed position in this manner, the controller 110 gives a drive stop instruction to the cover motor 82.

The controller 110 gives an open instruction to the extraction valve 51 at the same time when giving the drive instruction to the cover motor 82. Accordingly, the extraction valve 51 is opened, and thus the coffee beverage stored in the cylinder 30 is discharged into the beverage container C through the extraction passage 50.

A predetermined amount of coffee beverage is discharged into the beverage container C in this manner, whereby the coffee beverage is provided to a user.

After the coffee beverage has been discharged in this manner, the controller 110 gives a close instruction to the extraction valve 51, and also gives a drive instruction to the cover motor 82 to drive the cover motor 82 in the normal rotation direction. Accordingly, the cover member 80 is moved backward from the fully closed position. When the cover member 80 is moved backward in this manner, the distal end portion 92a of the removing member 92 is brought into sliding contact with the surface of the scraper 102 of the scraper portion 100 kept in the horizontal attitude (see FIG. 12). Accordingly, the extraction residue K sticking to the surface of the scraper 102 is scraped off forward by the distal end portion 92a of the removing member 92, and the scraped-off extraction residue K is collected in the residue receptacle B. Subsequently, the cover member 80 returns to the standby state.

As described in the foregoing, in the beverage extraction device 10 according to the embodiment of the disclosure, the engagement long holes 85 and the scraper spring 104 form an attitude adjustment unit that keeps the scraper portion 100 in the basic attitude under a normal condition, and keeps the scraper portion 100 in the horizontal attitude when the scraper portion 100 is brought into contact with the contact member 90.

With the beverage extraction device 10 according to the present embodiment, when the scraper portion 100 that is pivotally supported by the cover member 80 so as to be swingable takes the basic attitude and the cover member 80 is moved from the fully opened position toward the fully closed position, the lower end portion 100*a* slides on the mesh member 41 to remove the extraction residue K placed on the mesh member 41. When the cover member 80 approaches the fully closed position, the contact member 90 comes into contact with the scraper portion 100 sliding on the mesh member 41, thereby causing the scraper portion 100 to take the attitude in which the lower end portion 100*a* swings upward. Thus, the extraction residue K sticking to the surface of the scraper 102 can be released into the residue receptacle B by centrifugal force generated by this swinging. This makes it possible to favorably remove the extraction residue K while preventing the extraction residue K from sticking to the scraper portion 100 and remaining thereon.

The removing member 92 can further prevent the extraction residue K from remaining on the scraper portion 100 particularly when the cover member 80 is moved from the fully closed position to the fully opened position, because the distal end portion 92*a* thereof is brought into sliding contact with the surface of the scraper 102 of the scraper portion 100 kept in the horizontal attitude thereby scraping off forward and removing the extraction residue K sticking to this surface.

Furthermore, when the cover member 80 is moved from the fully opened position to the fully closed position, the scraper portion 100 removes the extraction residue K placed on the mesh member 41 closing the upper-surface opening 33, and thus the residue receptacle B for collecting extraction residue K can be arranged in front of the cylinder 30. This makes it possible to sufficiently increase the capacity of the residue receptacle B while avoiding increase in height dimensions of arrangement areas of the beverage extraction device 10 and the residue receptacle B. Thus, the collectable amount of extraction residue K can be increased.

The preferred embodiment of the disclosure has been described above. However, the disclosure is not limited to this, and various modifications may be made.

Although no particular mention is made in the embodiment described above, when the cover member 80 is started to be moved from the fully closed position toward the fully opened position, PWM control may be performed such that the movement speed of the cover member 80 is lower than the speed at which the cover member 80 is moved from the fully opened position to the fully closed position. By this control, the distal end portion 92*a* of the removing member 92 is brought into sliding contact with the surface of the scraper 102 at a slow speed, whereby extraction residue K sticking to the surface of the scraper 102 can be more reliably removed.

In the embodiment described above, when the mesh member 41 has reached the top dead point (see FIG. 19), the controller 110 gives a drive stop instruction to the piston motor 45 and then gives a drive instruction to the cover motor 82 to drive the cover motor 82 in the reverse rotation direction. However, in the disclosure, the following control may be performed instead.

Figure 21:
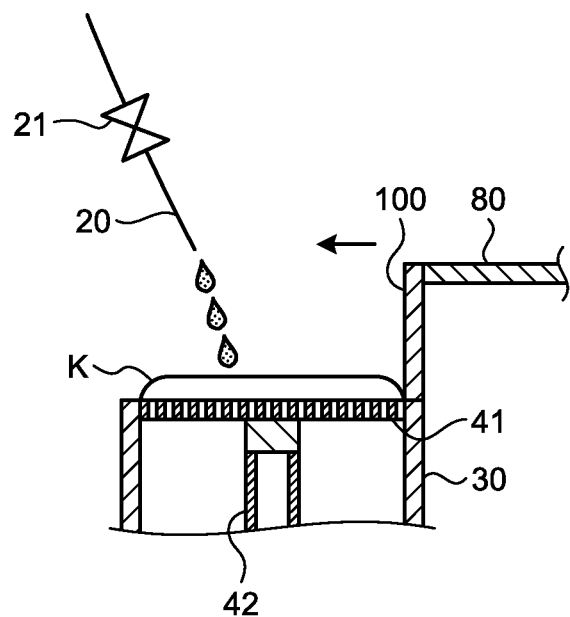
FIG. 21 is an explanatory diagram partially illustrating beverage extraction operation of a modification of the beverage extraction device according to the embodiment of the disclosure.

Specifically, when the mesh member 41 has reached the top dead point, after giving the drive stop instruction to the piston motor 45, the controller 110 may give an instruction to the hot-water supply valve 21 to open the valve for a predetermined period to supply hot water to the extraction residue K as depicted in FIG. 21, and then may give the drive instruction to the cover motor 82 to drive the cover motor 82 in the reverse rotation direction. By this control, also residue sticking to the mesh member 41 can be caused to float by the hot water, and then can be easily scraped by the scraper portion 100.

Figure 22:
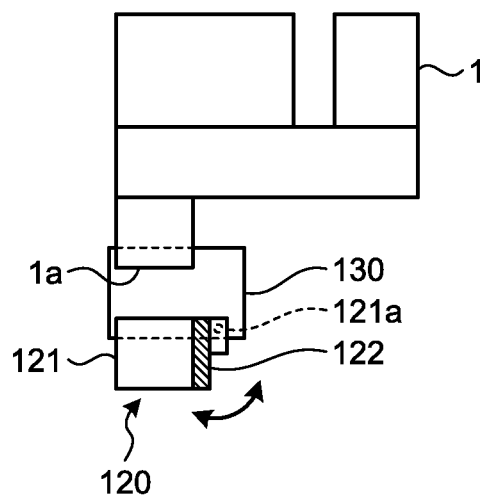
FIG. 22 is a schematic diagram illustrating main components of the modification of the beverage extraction device according to the embodiment of the disclosure.
Figure 23:
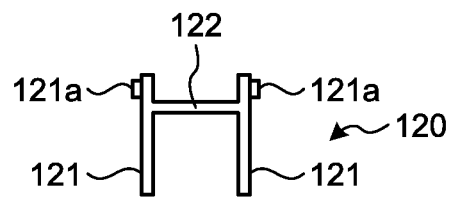
FIG. 23 is a plan view of a mill shoot depicted in FIG. 22.

In the disclosure, in the beverage extraction device 10 configured as described above, a mill shoot 120 may be additionally provided as depicted in FIG. 22. As depicted in FIG. 23, the mill shoot 120 has a structure in which a pair of left and right side-wall plates 121 are connected to a rear wall plate 122, and pivotally supported projections 121*a* formed on the side-wall plates 121 are pivotally supported by a shoot support member 130 provided to the mill 1, and thus the mill shoot can be swung about the axis of the pivotally supported projections 121*a*.

Figure 24:
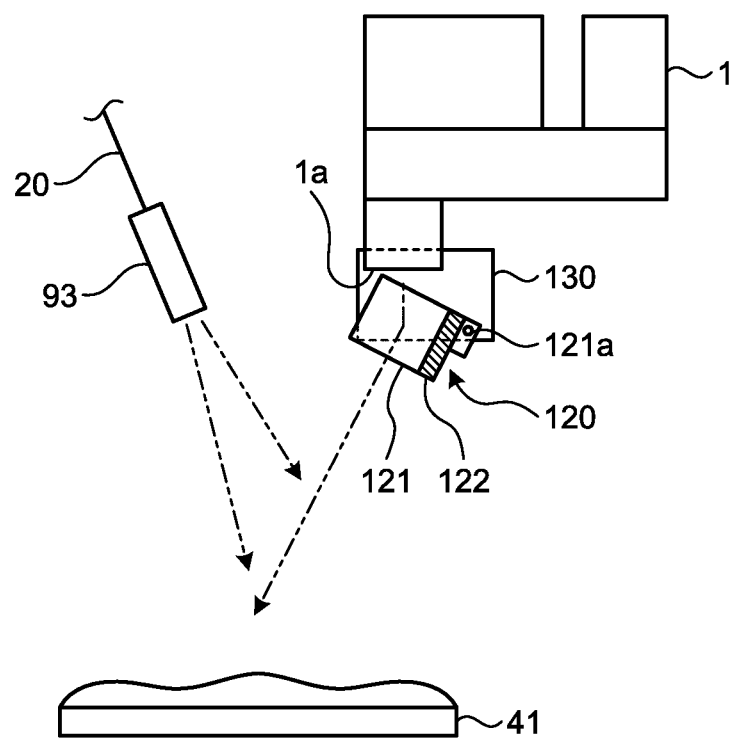
FIG. 24 is a schematic diagram illustrating operation of the beverage extraction device depicted in FIG. 22.

By changing the arrangement angle of the mill shoot 120 depending on the angle at which hot water is to be discharged from the nozzle 93, beverage raw material from the mill 1 and hot water from the hot-water passage 20 can be mixed in the air as depicted in FIG. 24, whereby this mixture can be fed onto the whole area of the mesh member 41 in a substantially uniform manner.

In the embodiment described above, the engagement long holes 85 and the scraper spring 104 form the attitude adjustment unit that keeps the scraper portion 100 in the basic attitude under the normal condition, and keeps the scraper portion 100 in the horizontal attitude when the scraper portion 100 is brought into contact with the contact member 90. However, in the disclosure, this attitude adjustment unit does not have to be formed.

Figure 25:
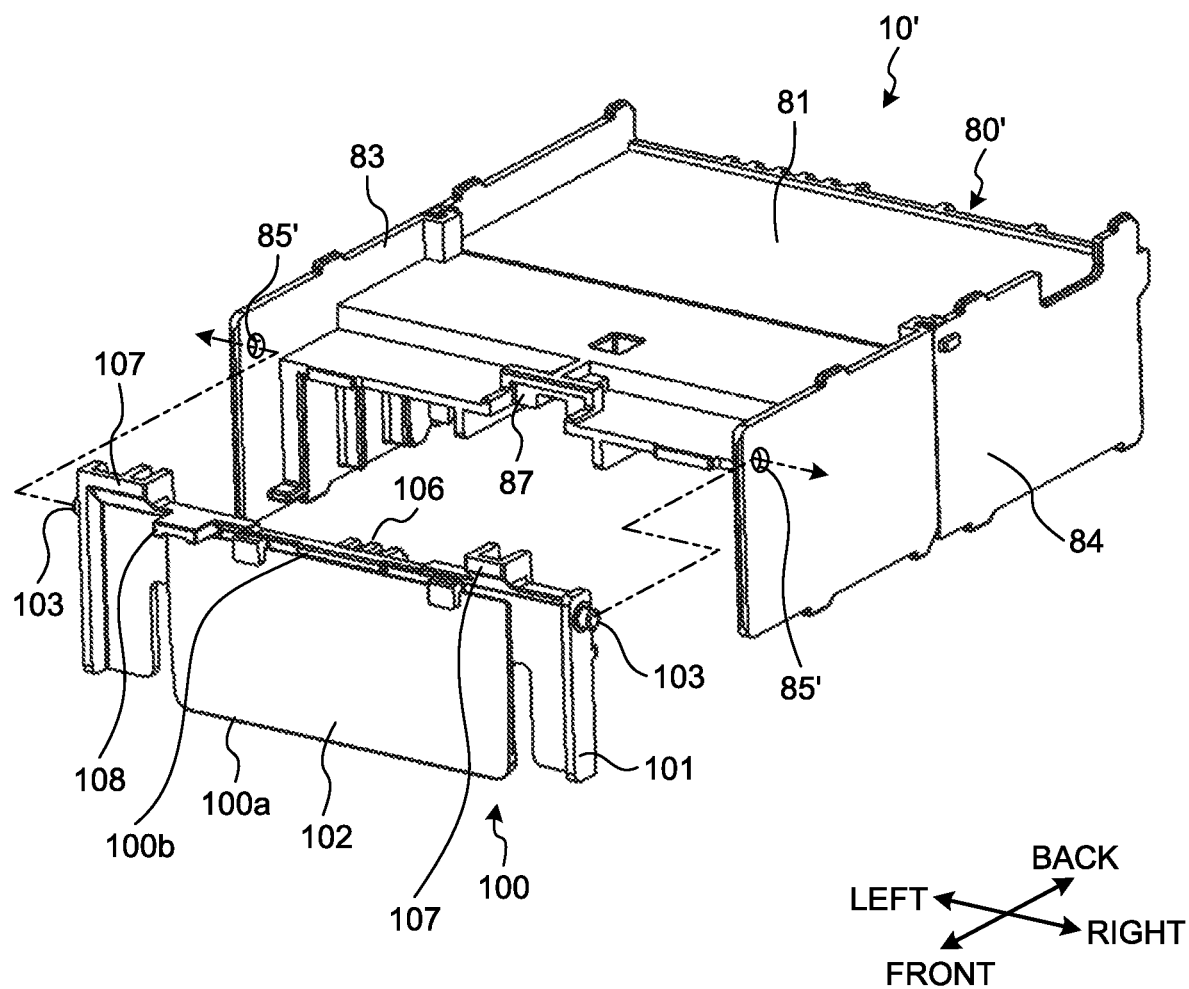
FIG. 25 is an exploded perspective view of a cover member in another modification of the beverage extraction device according to the embodiment of the disclosure.

Specifically, in a beverage extraction device 10' that is a modification of the beverage extraction device 10, in the left wall portion 83 and the right wall portion 84 of a cover member 80', as depicted in FIG. 25, engagement circular holes 85' may be formed instead of the engagement long holes 85, and the engaging projections 103 of the scraper support member 101 may be inserted into the engagement circular holes 85', whereby the scraper portion 100 may be pivotally supported so as to be swingable.

Figure 26:
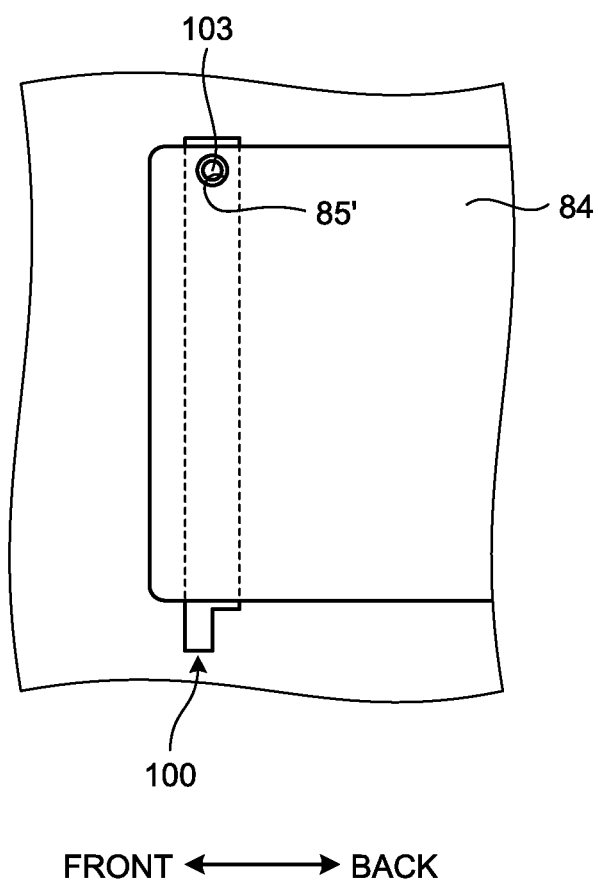
FIG. 26 is a schematic diagram illustrating the scraper portion in a basic attitude.

In this case also, the scraper portion 100 is biased by the scraper spring 104 (see FIG. 6) because the scraper spring 104 is interposed between the scraper portion 100 and the cover member 80', and the first protruding piece 106 formed on the scraper support member 101 above the hooked piece 105 is in contact with the central portion 87 formed on the front end surface of the upper wall portion 81 of the cover member 80'. This enables the scraper portion to be kept in the basic attitude in which the lower end portion 100*a* is positioned below the upper end portion 100*b* as depicted in FIG. 26.

The scraper portion 100 thus configured closes the opening at the front wall portion of the cover member 80' when being brought into the basic attitude. Furthermore, the vertical dimension of the scraper portion is determined so that the lower end portion 100*a* of the scraper 102 can be brought into sliding contact with the upper surface of the cylinder 30 when the cover member 80' is moved between the fully opened position and the fully closed position.

Figure 27:
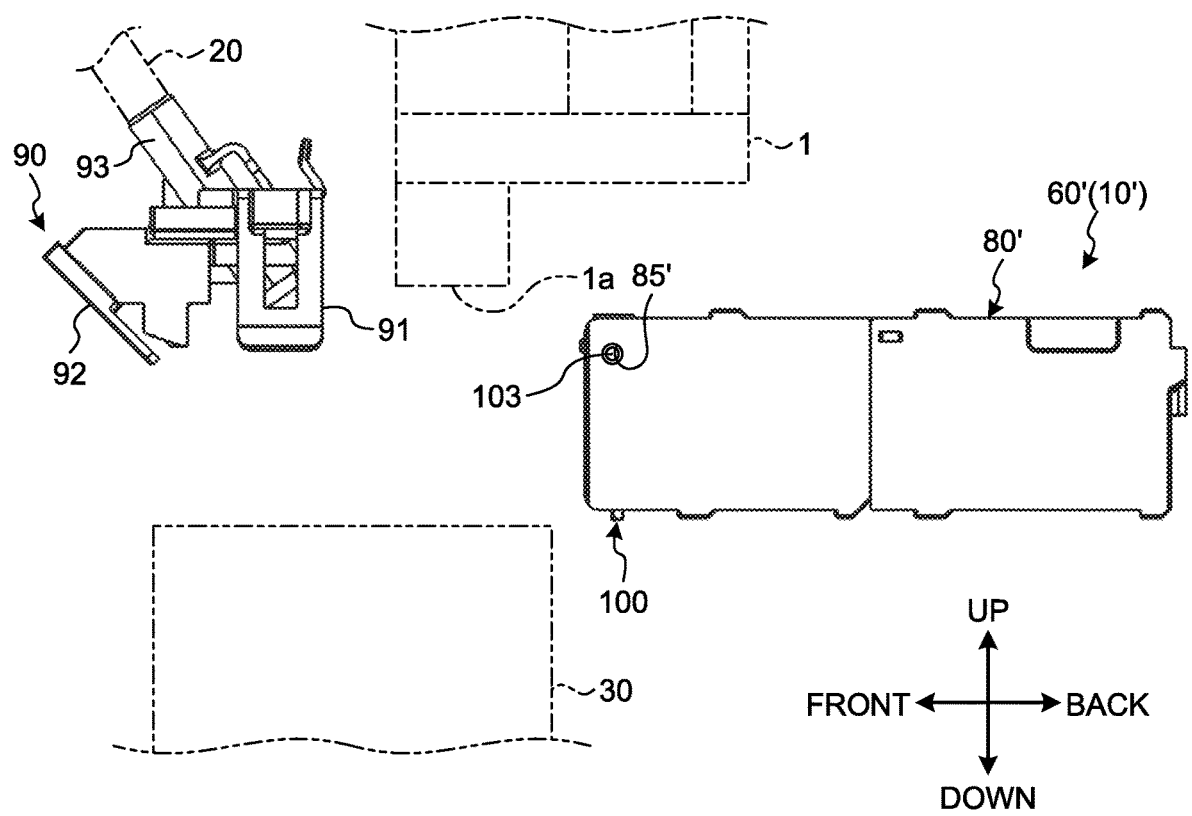
FIG. 27 is a schematic diagram schematically illustrating a positional relation between the cover member depicted in FIG. 25 and the contact member.
Figure 28:
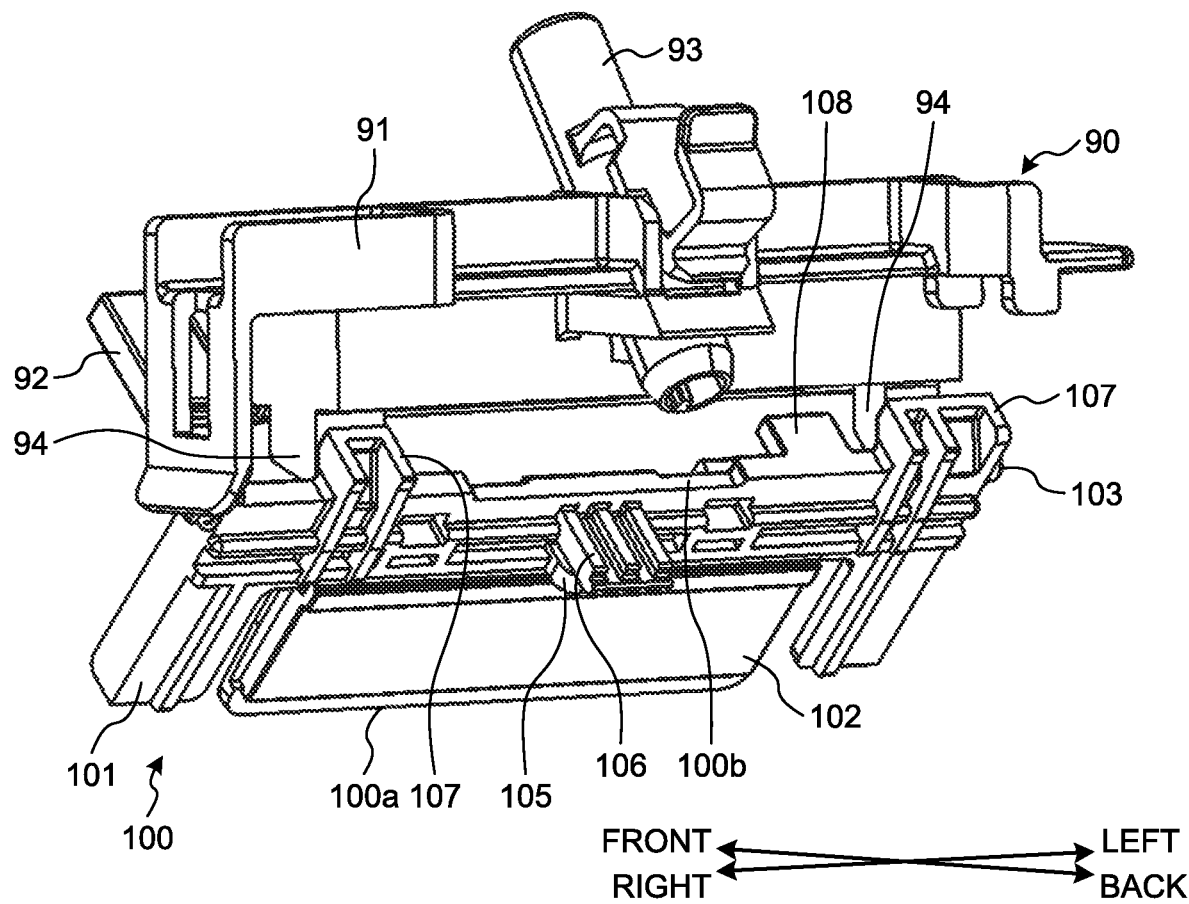
FIG. 28 is a perspective view illustrating a state in which the scraper portion and the contact member are in contact with each other.
Figure 29:
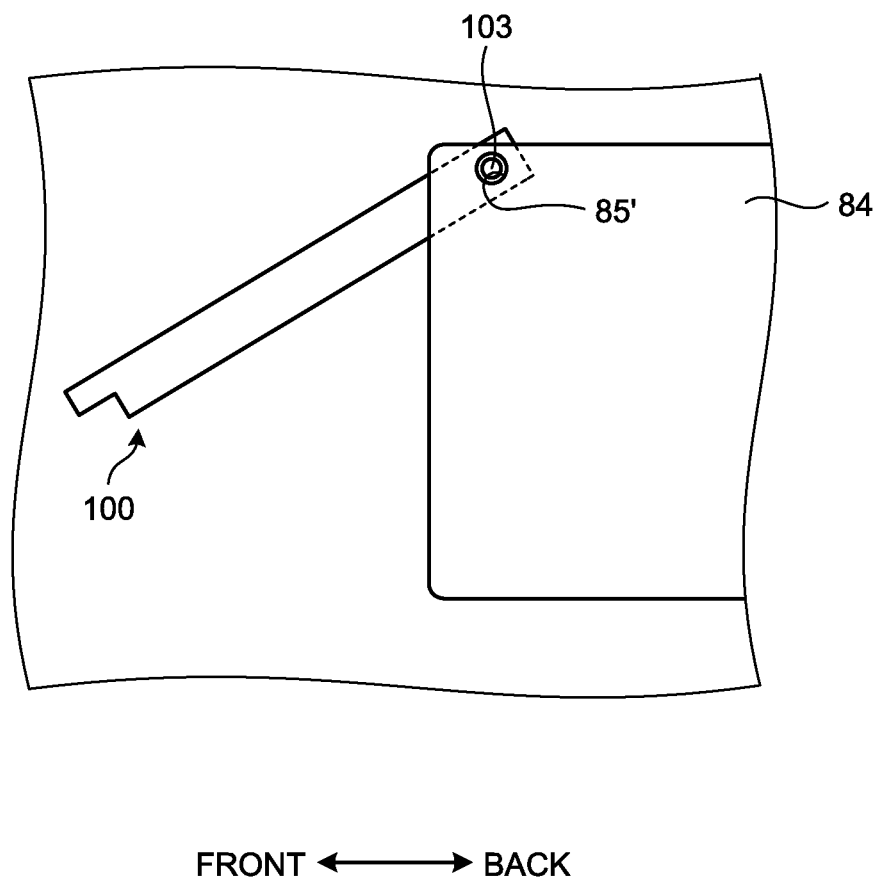
FIG. 29 is a schematic diagram illustrating a case when the scraper portion swings from the basic attitude.

The following describes operation of a cover unit 60' including the cover member 80' thus configured. In the standby state, as depicted in FIG. 27, the cover member 80' is disposed at the fully opened position. When the cover motor 82 is driven in the reverse rotation direction, the cover member 80' is moved forward. Accordingly, when the cover member 80' approaches the fully closed position, the second protruding pieces 107 of the scraper portion 100 (scraper support member 101) come into contact with the respective contact projections 94 as depicted in FIG. 28, whereby the lower end portion 100*a* of the scraper portion 100 is swung upward about the axis of the engaging projections 103 thereof against the biasing force of the scraper spring 104 as depicted in FIG. 29.

Figure 30:
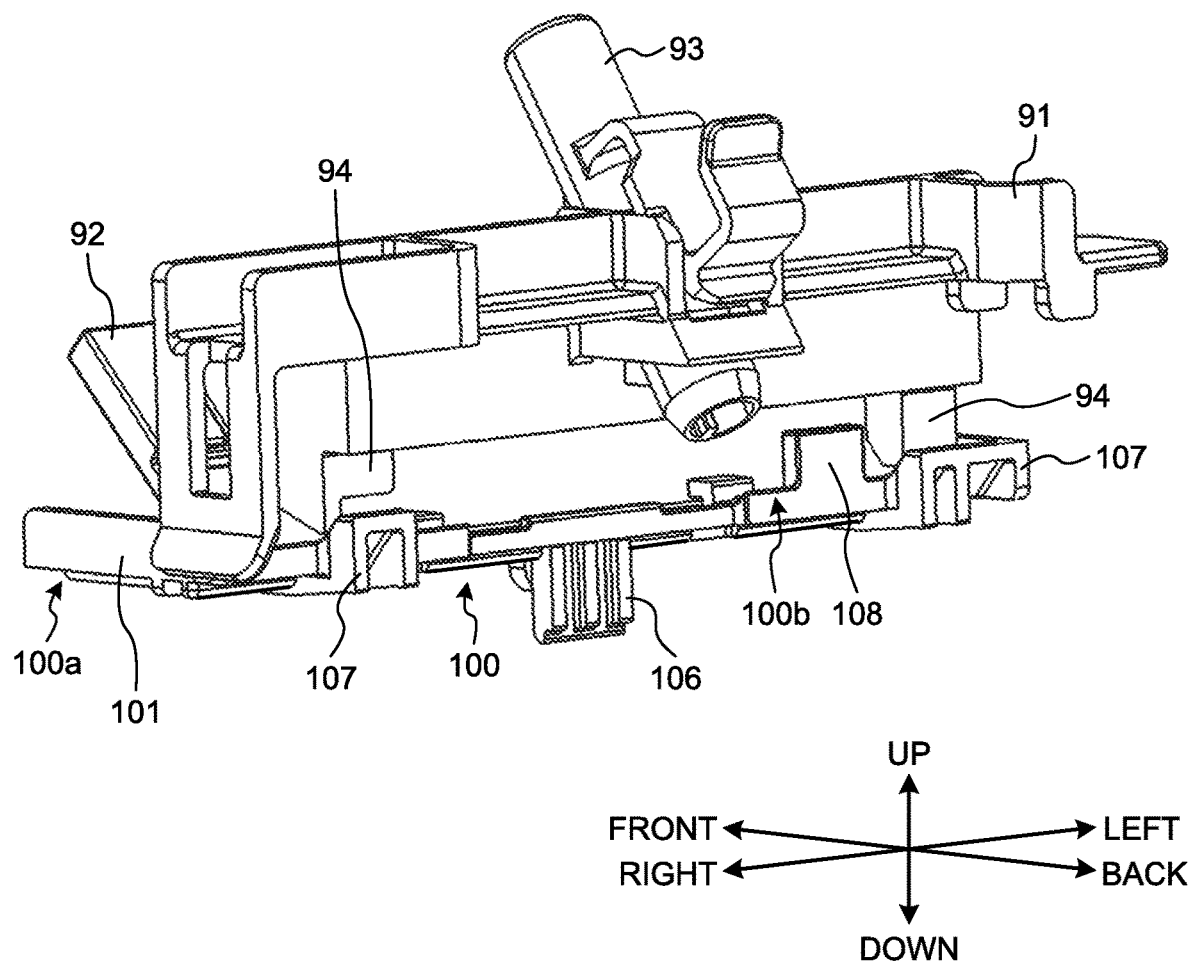
FIG. 30 is a perspective view illustrating a state in which the scraper portion and the contact member are in contact with each other.

When the cover member 80' has reached the fully closed position, the scraper portion 100 is caused to take the horizontal attitude in which the lower end portion 100*a* is positioned at the same height level as the upper end portion 100*b* as depicted in FIG. 30.

Subsequently, when the cover motor 82 is driven in the normal rotation direction whereby the cover member 80' is moved backward, the lower end portion 100*a* is swung downward, and the scraper portion 100 is kept in the basic attitude by the biasing force of the scraper spring 104 as depicted in FIG. 26.

As described above, in the cover unit 60', the cover member 80' is moved from the fully opened position toward the fully closed position to reach the fully closed position, whereby the scraper portion 100 is swung to be brought from the basic attitude into the horizontal attitude. When the cover member 80' is moved from the fully closed position to the fully opened position, the scraper portion 100 is swung from the horizontal attitude to the basic attitude.

Figure 31:
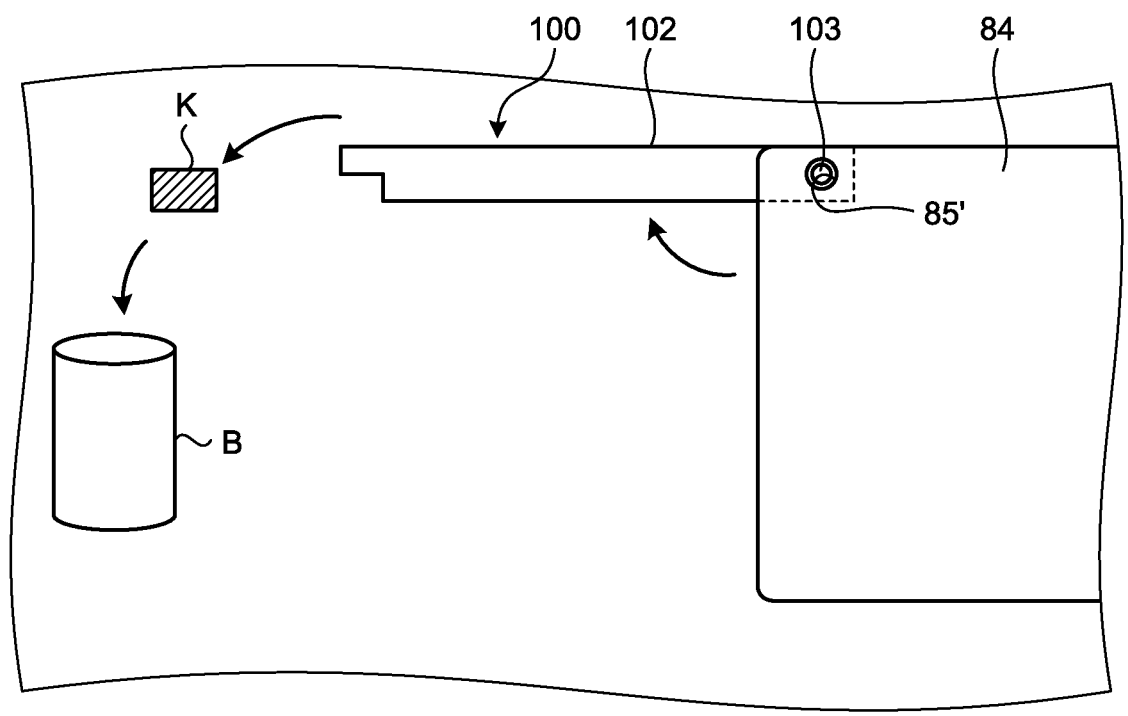
FIG. 31 is a schematic diagram schematically illustrating a state in which the scraper portion swings to shake off the extraction residue.

With the beverage extraction device 10' thus configured, when the scraper portion 100 that is pivotally supported by the cover member 80' so as to be swingable takes the basic attitude and the cover member 80' is moved from the fully opened position toward the fully closed position, the lower end portion 100*a* slides on the mesh member 41 to remove extraction residue K placed on the mesh member 41. When the cover member 80' approaches the fully closed position, the contact member 90 comes into contact with the scraper portion 100 sliding on the mesh member 41, thereby causing the scraper portion 100 to take the attitude in which the lower end portion 100*a* swings upward as depicted in FIG. 31. Thus, the extraction residue K sticking to the surface of the scraper 102 can be released into the residue receptacle B by centrifugal force generated by this swinging. This makes it possible to favorably remove the extraction residue K while preventing the extraction residue K from sticking to the scraper portion 100 and remaining thereon.

According to the disclosure, the scraper portion that is pivotally supported so as to be swingable by the cover member that is movable between the first position and the second position along the direction orthogonal to the axial direction of the cylinder takes the basic attitude in which the lower end portion is positioned lower than the upper end portion under the normal condition. When the cover member is moved from the first position toward the second position, the lower end portion slides on the mesh member to remove the extraction residue placed on the mesh member. When the cover member approaches the second position, the contact member comes into contact with the scraper portion sliding on the mesh member, thereby causing the scraper portion to take the attitude in which the lower end portion swings upward. Thus, the extraction residue sticking to a surface of the scraper portion can be released into a residue receptacle by centrifugal force generated by this swinging. This provides an effect of making it possible to favorably remove the extraction residue while preventing the extraction residue from sticking to the scraper portion and remaining thereon.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A beverage extraction device for extracting a beverage from beverage raw material and hot water, comprising:
   a cylinder having a side surface to form a cylindrical shape, the beverage raw material and the hot water being fed into the cylinder and the beverage extracted from the beverage raw material and the hot water being discharged from the cylinder;
   a mesh member placed in the cylinder and having a disk shape in which a plurality of through holes are formed, the mesh member being configured to be connected to a piston motor and moved along an axial direction of the cylinder by the piston motor, while being in contact with an inside surface of the cylinder, to extract the beverage from the beverage raw material and the hot water,
   a cover member configured to be connected to a cover motor and moved between a first position and a second position along a direction orthogonal to the axial direction of the cylinder by the cover motor;
   a scraper portion including a pivot axis and a protruding piece protruding upwardly from an upper end portion thereof, the scraper portion being pivotally supported to the cover member and configured to swing on the pivot axis, a lower end portion of the scraper portion taking a basic attitude in which the lower end portion is positioned lower than the upper end portion under a normal condition, the lower end portion being configured to slide on the mesh member to remove an extraction residue placed on the mesh member when the cover member is moved from the first position toward the second position; and
   a contact member including a contact projection facing the protruding piece of the scraper portion and a removing member having a distal end portion, the contact projection of the contact member being configured to push the protruding piece of the scraper portion sliding on the mesh member to cause the scraper portion to take an attitude in which the lower end portion swings upward when the cover member approaches the second position and cause a horizontal attitude in which the lower end portion is positioned at substantially the same height level as the upper end portion when the cover member is positioned at the second position, the distal end portion of the contact member being configured to be brought into sliding contact with a surface of the scraper portion kept in the horizontal attitude to remove another extraction residue sticking to the surface of the scraper portion when the cover member is moved from the second position to the first position.

2. The beverage extraction device according to claim 1, wherein
   the cylinder has a bottomed cylindrical shape a lower-surface opening of which is closed with a bottom portion,
   the mesh member is configured to close an upper-surface opening of the cylinder when the extracted beverage is discharged, and
   the cover member is configured to open the upper-surface opening of the cylinder when being disposed at the first position, and close the upper-surface opening of the cylinder when being disposed at the second position.

3. The beverage extraction device according to claim 1, wherein the cover member further includes engagement holes at two sides thereof, and the scraper portion further includes engaging projections protruding toward the cover member at the upper end portion thereof and pivotally supported into the engagement holes to be swingable on the pivot axis.

4. A beverage extraction device for extracting a beverage from beverage raw material and hot water, comprising:
- a cylinder having a side surface to form a cylindrical shape, the beverage raw material and the hot water being fed into the cylinder and the beverage extracted from the beverage raw material and the hot water being discharged from the cylinder;
- a mesh member placed in the cylinder and having a disk shape in which a plurality of through holes are formed, the mesh member being configured to be connected to a piston motor and moved along an axial direction of the cylinder by the piston motor, while being in contact with an inside surface of the cylinder, to extract the beverage from the beverage raw material and the hot water,
- a cover member configured to be connected to a cover motor and moved between a first position and a second position along a direction orthogonal to the axial direction of the cylinder by the cover motor;
- a scraper portion including a pivot axis and a protruding piece protruding upwardly from an upper end portion thereof, the scraper portion being pivotally supported to the cover member and configured to swing on the pivot axis, a lower end portion of the scraper portion taking a basic attitude in which the lower end portion is positioned lower than the upper end portion under a normal condition, the lower end portion being configured to slide on the mesh member to remove an extraction residue placed on the mesh member when the cover member is moved from the first position toward the second position;
- a contact member including a contact projection facing the protruding piece of the scraper portion, the contact projection of the contact member being configured to push the protruding piece of the scraper portion sliding on the mesh member to cause the scraper portion to take an attitude in which the lower end portion swings upward when the cover member approaches the second position and cause a horizontal attitude in which the lower end portion is positioned at substantially the same height level as the upper end portion when the cover member is positioned at the second position; and
- an attitude adjustment unit configured to keep the scraper portion in the basic attitude under the normal condition, and keep the scraper portion in the horizontal attitude when the scraper portion is brought into contact with the contact member, wherein
during movement of the cover member from the second position to the first position, the attitude adjustment unit is configured to cause the scraper portion to take the basic attitude when the scraper portion being in the horizontal attitude is brought into contact with an attitude return projection.

5. The beverage extraction device according to claim 4, further comprising a removing member that is provided in the contact member, and a distal end portion of which is brought into sliding contact with a surface of the scraper portion kept in the horizontal attitude to remove another extraction residue sticking to the surface of the scraper portion when the cover member is moved from the second position to the first position.

6. The beverage extraction device according to claim 4, wherein
the cylinder has a bottomed cylindrical shape a lower-surface opening of which is closed with a bottom portion,
the mesh member is configured to close an upper-surface opening of the cylinder when the extracted beverage is discharged, and
the cover member is configured to open the upper-surface opening of the cylinder when being disposed at the first position, and close the upper-surface opening of the cylinder when being disposed at the second position.

7. The beverage extraction device according to claim 5, wherein
the cylinder has a bottomed cylindrical shape a lower-surface opening of which is closed with a bottom portion,
the mesh member is configured to close an upper-surface opening of the cylinder when the extracted beverage is discharged, and
the cover member is configured to open the upper-surface opening of the cylinder when being disposed at the first position, and close the upper-surface opening of the cylinder when being disposed at the second position.

* * * * *